United States Patent [19]
Dams et al.

[11] Patent Number: 5,453,540
[45] Date of Patent: * Sep. 26, 1995

[54] ISOCYANATE DERIVATIVES COMPRISING FLUOROCHEMICAL OLIGOMERS

[75] Inventors: Rudolf J. Dams; Johan E. De Witte, both of St. Paul, Minn.

[73] Assignee: Minnesota Mining and Manufacturing Company, St. Paul, Minn.

[*] Notice: The portion of the term of this patent subsequent to Mar. 8, 2011 has been disclaimed.

[21] Appl. No.: 158,203

[22] Filed: Nov. 29, 1993

Related U.S. Application Data

[62] Division of Ser. No. 679,633, Apr. 2, 1991, Pat. No. 5,276,175.

[51] Int. Cl.$^6$ .................. C07C 311/09; C08L 61/32
[52] U.S. Cl. .................. 564/96; 548/229; 524/598; 524/520; 525/199; 525/200; 525/474; 525/509; 525/518; 525/519; 427/389; 427/389.9; 427/391; 427/392; 427/393.5; 428/421; 428/473; 428/524; 428/526; 428/530; 428/532; 428/537.5
[58] Field of Search .................. 564/96; 548/229

[56] References Cited

U.S. PATENT DOCUMENTS

| | | | |
|---|---|---|---|
| 3,088,849 | 5/1963 | Friedlander | 564/96 |
| 3,574,791 | 4/1971 | Sherman et al. | 260/884 |
| 3,758,447 | 9/1973 | Falk et al. | 260/78.5 |
| 3,787,351 | 1/1974 | Olson | 260/40 |
| 4,054,592 | 10/1977 | Dear et al. | 560/25 |
| 4,302,366 | 11/1981 | Perronin et al. | 252/8.57 |
| 4,486,391 | 12/1984 | Hashimoto | 564/96 |
| 4,525,305 | 6/1985 | Patel | 260/401 |
| 4,534,770 | 8/1985 | Kelly | 8/115.6 |
| 4,557,837 | 12/1985 | Clark, III et al. | 252/8.55 |
| 4,606,737 | 8/1986 | Stern | 8/115.6 |
| 4,766,234 | 8/1988 | Wehowsky et al. | 560/26 |
| 4,782,175 | 11/1988 | Wehowsky et al. | 560/26 |
| 4,960,543 | 10/1990 | Wehowsky et al. | 560/26 |
| 5,292,796 | 3/1994 | Dams et al. | 524/598 |

FOREIGN PATENT DOCUMENTS

| | | |
|---|---|---|
| 0166599 | 1/1986 | European Pat. Off. . |
| 3607773 | 9/1987 | Germany . |
| 55-7820 | 6/1978 | Japan . |
| 63-27366 | 7/1980 | Japan . |

OTHER PUBLICATIONS

H. C. Fielding, "Organofluorine Compounds and Their Applications", R. E. Banks, Ed., Society of Chemical Industry, p. 214 (1979).
Makromol. Chem. 1986, 187, 1627 (Akemi et al.).
J. Polymer Science, Part. A. 1988, 26, 2991 (Chujo et al.).
Polymer Bulletin, 1982, 8, 239 (Chujo et al.).
Derwent Publications Ltd. JP–B–63027366 (Asahi) (1980).

Primary Examiner—Richard L. Raymond
Assistant Examiner—Mary C. Cebulak
Attorney, Agent, or Firm—Gary L. Griswold; Walter N. Kirn; Robert H. Brink

[57] ABSTRACT

Fluorochemical compositions comprising fluorinated compounds, wherein the fluorinated compound comprises fluorochemical oligomeric portion, an organic moiety, and a group that can impart soft hand, stain release, water repellency, or a durable property when the compound is applied to a fibrous substrate, wherein the fluorochemical oligomeric portion is bonded to the organic moiety through an isocyanate-derived linking group. Also disclosed are fluorochemical compositions in the form of fluorochemical liquid dispersions and methods for preparing substrates treated with such compositions. Substrates so treated exhibit particularly durable and abrasion-resistant oil and water repellent properties. Intermediates in the preparation of the fluorochemical compositions are also disclosed. Some of the intermediates are useful as emulsifiers in fluorochemical liquid dispersions.

36 Claims, No Drawings

ISOCYANATE DERIVATIVES COMPRISING FLUOROCHEMICAL OLIGOMERS

This is a division of application Ser. No. 07/679,633, filed Apr. 2, 1991, now U.S. Pat. No. 5,276,175.

This invention relates to fluorochemical compositions for use in providing repellent properties to a substrate material. In another aspect, this invention relates to fluorochemical compounds that contain fluoroaliphatic groups proximal to one another. In yet another aspect, it relates to fluorochemical compounds that are at least in part oligomeric in nature. In still another aspect, this invention relates to fluorochemical compounds that contain functional groups derived from an isocyanato group. This invention also relates to fluorochemical compounds that impart a durable property such as water repellency when applied to substrate materials, and in another aspect to substrates that are treated with fluorochemical compounds.

Organofluorine compounds (i.e., fluorochemicals) are substances containing portions which are fluorocarbon in nature (e.g., hydrophobic, oleophobic, and chemically inert) and portions which are organic or hydrocarbon in nature (e.g., chemically reactive in organic reactions). Some fluorochemicals are familiar to the general public, such as SCOTCHGARD™ carpet protector, which imparts oil and water repellency and stain and soil resistance to carpet. Other such substances have various industrial uses, such as reducing the surface tension of liquids, reducing evaporation and inflammability of volatile organic liquids, and improving the leveling of organic polymer coatings.

The utility of organofluorine compounds as surface-active agents (i.e., surfactants) and surface-treating agents is due in large part to the extremely low free-surface energy of a $C_6$–$C_{12}$ fluorocarbon group, according to H. C. Fielding, "*Organofluorine Compounds and Their Applications*," R. E. Banks, Ed., Society of Chemical Industry at p. 214 (1979). Generally, the organofluorine substances described above are those which have carbon-bonded fluorine in the form of a monovalent fluoroaliphatic radical such as a perfluoroalkyl group, typically $C_nF_{2n+1}$, where n is at least 3, the terminal part of which group is trifluoromethyl, —$CF_3$.

Pertinent to the present invention are fluorochemical compositions involving oligomeric fluorochemicals (sometimes referred to as macromeric fluorochemicals). U.S. Pat. No. 3,574,791 (Sherman et al.) describes hydroxy-terminated prepolymers containing fluorinated segments and hydrophilic segments. Such prepolymers are made by free radical polymerization of a fluorine-containing acrylate with a non-fluorinated acrylate in the presence of an initiator and a functional mercaptan (e.g., 2-mercaptoethanol). Also described is the conversion of an above-described prepolymer to a methacrylate by esterification of the prepolymer with methacrylic anhydride, and the co-polymerization of the resulting methacrylate with a monomer containing a hydrophilic group.

U.S. Pat. No. 3,758,447 (Falk et al.) describes polymers that result from free radical polymerization of a monomer in the presence of perfluoroalkyl mercaptans, which act as chain-transfer agents. Mercaptans that contain pairs or triplets of closely-packed perfluoroalkyl groups are said to produce polymers with higher oil repellency levels compared with analogous polymers derived from a mercaptan with just one perfluoroalkyl group or perfluoroalkyl groups that are not closely packed.

U.S. Pat. No. 4,302,366 (Perronin et al.) describes fluorinated products resulting from the reaction of (a) one molecule of one or more acids of the formula:

$$HS—A(COOH)_n \qquad (i)$$

and of (b) one to five molecules of one or more compounds possessing at least one ethylenic bond, at least one of these compounds corresponding to the general formula:

$$R_f—B—\underset{\underset{R}{|}}{C}=CH—R \qquad (ii)$$

and possibly neutralized or partially neutralized with an inorganic or organic base.

In the formulae (i) and (ii), "A" represents an aliphatic or aromatic hydrocarbon radical, "n" is a whole number from 1 to 4, "$R_f$" represents a straight or branched perfluorinated chain containing 1 to 20 carbon atoms, "B" represents bivalent, possibly branched, chaining and may comprise sulfur, oxygen or nitrogen atoms, one of the symbols "R" represents a hydrogen atom and the other a hydrogen atom or an alkyl group containing 1 to 4 carbon atoms. These fluorinated products applied to substrate materials are said to confer an oilproofing and waterproofing effect as well as a resistance to aggressive products or solvents.

U.S. Pat. No. 4,525,305 (Patel) describes fluorochemical aliphatic carboxylic acids, and water dispersible salts thereof, having fluoroaliphatic radicals and urylene and/or carbamate radicals. Among the compositions described are those resulting from the reaction of a fluorochemical alcohol with an excess of an organic diisocyanate, following by reaction of the resultant fluorochemical urethane-containing isocyanate with a hydroxy-substituted carboxylic acid. The compositions are said to impart oil and water repellency to fibrous substrates such as tanned leather.

Japanese Patent No. 63-27366 describes a method of manufacture of a fluorine-containing block oligomer characterized by the following general formula:

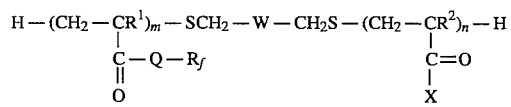

wherein:

$R_f$ represents a polyfluoroalkyl group with 3–20 carbon atoms, $R^1$ and $R^2$ represent hydrogen atoms or methyl groups, m and n represent integers from 1–40, Q represents —O—A, —O—A—N(R)O$_2$S, or —O—A—N(R)OC—, A represents a bifunctional alkylene group with 1–10 carbon atoms, R represents hydrogen atom or alkyl group, x represents —OR$^3$, —NHR$^3$, —NR$^3$R$^4$, $$-\underset{-}{N}-\underset{+}{N}-R^3(R^4)(R^5),$$

or —OCH$_2$CH$_2$NR$^3$(R$^4$)(O),

R$^3$, R$^4$, R$^5$ or represent hydrogen atoms, alkyl groups, allyl group, aralkyl groups, or hydroxyalkyl groups, Y and Z represent —CO$_2$CH, or —CH$_2$NH$_2$, and w represents —CO$_2$CH$_2$—, CH$_2$OCH$_2$—, or —CONHCH$_2$—.

U.S. Pat. No. 4,557,837 (Clark, III et al.) describes an oligomeric methanol foaming agent comprising an oligomeric backbone with three or more fluorine containing moieties attached thereto and two or more polar methanol-solubilizing groups attached thereto. The oligomeric backbone is composed of repeating units, urylene- and carbamato-containing units among them.

Japanese Unexamined Application (Kokai) 55-7820 describes a method of modifying a polymer by adding a small amount of the fluoro compound described below:

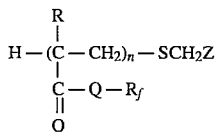

wherein $R_f$ is polyfluoroalkyl with 3–20 carbon atoms,

R is a hydrogen atom or methyl group,

Z is —$CO_2H$, —$CH_2OH$, or —$CH_2NH_2$,

Q is a bivalent organic radical, and n is an integer between 1–40 or a derivative of the fluoro compound in which a functional radical is bonded through an active radical in Z to a synthetic polymer. Also described is a method for improving the surface of a synthetic polymer by addition of small quantities of the above-described compound, lowering the surface friction.

*Macromol. Chem.* 1986, 187, 1627 (Akemi et al.) describes block copolymers prepared from the reaction of, e.g., (i) oligomeric α-hydro-ω-(2-hydroxyethylthio)poly-[1-(3,3,4,4,5,5,6,6,6-nonafluorohexyloxycarbonyl)ethylene], and (ii) oligomeric α,ω-Bis(4-cyanatophenylthio)poly(1-phenylethylene). This block copolymer is said to have good antithrombogenicity due to the surface free energy gap between microdomains.

*J. Polymer Science, Part A* 1988, 26, 2991 (Chujo et al.) describes a di-carboxyl terminated macromonomer prepared by the free radical co-polymerization of a perfluoroalkyl-ethyl acrylate and methyl methacrylate in the presence of thiomalic acid. Also described is the reaction of such macromonomers with organic dicarboxylic acids and organic diamines in the presence of an appropriate catalyst to afford a copolymer wherein the macromonomer is grafted onto a polyamide chain.

In addition to the fluorochemicals described above, some non-fluorinated macromonomers and some reactions thereof have been reported. For example, *Polymer Bulletin* 1982, 8, 239 (Chujo et al.) describes a di-hydroxyl terminated macromonomer prepared by free radical polymerization of methyl methacrylate in the presence of α-thioglycerol. Also described is the reaction of this macromonomer with 1,4-butanediol and an organic diisocyanate to afford a copolymer wherein the macromonomer is grafted onto a polyurethane chain. No utility is described for these compounds.

U.S. Pat. No. 3,787,351 (Olsen) discloses, e.g., the reaction of a hydroxy-terminated fluorochemical oligomer with 2,4-toluene diisocanate. The product of said reaction is then reacted with a poly(oxyalkylene)polyol to afford a fluoroaliphatic block copolymer with urethane linkages. The compounds of said patent are said to improve the mechanical properties of shaped articles.

This invention provides a fluorochemical composition comprising one or more fluorinated compounds, each of the latter comprising:

(i) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;

(ii) an organic moiety (which can be functional or non-functional, and which is different from the fluorochemical oligomeric portion);

(iii) a non-polymeric isocyanate-derived linking group which links the fluorochemical oligomeric portion to the organic moiety; and (iv) a group bonded thereto, which can impart soft hand, stain release, water repellency, or a durable property when the compound is applied to a fibrous substrate, with the proviso that any group that can impart stain release is bonded to the fluorochemical oligomeric portion.

As used in the instant specification and claims, the terms "isocyanate-derived" and "isocyanate derivative" designate compounds or groups that are capable of being prepared by a known reaction of an isocyanate. While such compounds or groups are preferably prepared from isocyanates, these terms are not intended to require that an isocyanate actually be used in their preparation. Isocyanate-derived linking groups are referred to herein using a nomenclature system analogous to that from which the term "urylene" arises with respect to urea-containing compounds. Accordingly, a linking group with the structure of a biuret will be referred to as "biuretylene"; guanidine: "guanidinylene"; carbodiimide: "carbodiimidylene", and so forth. "Non-polymeric" when used to define an isocyanate-derived linking group designates a linking group in which the isocyanate-derived moiety is not a repeating unit in a polymeric chain (e.g., the linking group is not a polyamide or a polyurethane).

The fluorochemical compositions of the invention generally comprise mixtures of compounds. Accordingly, compounds are sometimes referred to herein as having non-integral numbers of particular substituents (e.g., "n=2.7"). In such cases the number indicates an average and is not intended to denote fractional incorporation of a substituent. Also, formulas used herein to represent the structures of the compounds of the invention indicate the presence of chains of polymerized units derived from fluorochemical and non-fluorinated monomers; those formulas are not intended to indicate ordering of units (e.g., "blocks" of units such as in a block copolymer, or alternating units) in the chain. The terms "oligomer" or "oligomeric" when used herein designate compounds containing a plurality of polymerized units, but fewer than that number of polymerized units present in a polymer (e.g., chains of 2 to about 40 polymerized units are to be considered "oligomeric").

A fluorinated compound contained in a fluorochemical composition of the invention comprises a group that can impart soft hand, stain release, water repellency, or a durable property (e.g., durable water repellency) when the compound is applied to a fibrous substrate, e.g., a natural fabric such as cotton or wool, or a synthetic fabric such as polyester or nylon, or blends of any two or more of the foregoing, or paper, leather, and the like. Preferred among such groups are blocked isocyanato (as described in detail below), carboxyl groups, and salts thereof.

This invention also provides fluorochemical compositions in the form of aqueous liquid dispersions comprising water, a fluorochemical compound of the invention in an amount effective to impart repellent properties to a substrate treated with the dispersion, and an emulsifier in an amount effective to stabilize the dispersion.

Further, this invention provides substrates that exhibit particularly durable and abrasion-resistant oil and water repellent properties imparted to the substrates by treatment with said aqueous liquid dispersions, and methods for preparing such substrates.

The fluorinated compounds in a composition of the invention generally contain a plurality of fluoroaliphatic groups proximal to one another (e.g., on alternating carbon atoms of an aliphatic backbone, or occasionally on adjacent carbon atoms), as distinct from isolated fluoroaliphatic groups distributed throughout the compound and also as distinct from fluoroaliphatic groups uniformly on adjacent carbon atoms. Substrates treated with preferred compositions of the invention exhibit considerably higher oil repellency than substrates treated with compositions containing only isolated fluoroaliphatic groups, and exhibit particularly high durability after laundering or dry cleaning.

In other preferred embodiments, the invention provides fluorochemical compositions comprising fluorinated compounds of Formulas I or II $$(A-Z)_n R \qquad\qquad I$$

$$A(Z-R)_n \qquad\qquad II$$

wherein A is a fluorochemical oligomeric portion of the formula

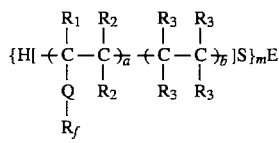

and wherein n is a whole number (e.g., from 1 to about 10);

m is an integer from 1 to about 5;

a and b are integers such that A is oligomeric and comprises a plurality of $R_f$ groups;

$R_1$ is hydrogen, halogen, or straight chain or branched chain alkyl containing 1 to about 4 carbon atoms; each $R_2$ is independently hydrogen or straight chain or branched chain alkyl containing 1 to about 4 carbon atoms;

Q is an organic linking group, such as a sulfonamidoalkylene group;

$R_f$ is a fluoroaliphatic group, such as —$(CF_2)_7CF_3$, that comprises a fully fluorinated terminal group;

each $R_3$ is independently hydrogen, halogen, or an organic group, such as a carboxyl group or an alkyl carboxylate group;

E is an organic group, such as —$CH_2CH_2$—;

each Z independently comprises a non-polymeric isocyanate-derived linking group (such as urethanylene); p1 R is an organic moiety;

and wherein, in the instance of Formula I, one of the $R_1$, $R_2$, $R_3$, Q, and E groups has an unsatisfied valence or a bond (not shown in the oligomeric formula above) through which the group is bonded to Z, and in the instance of Formula II, at least one of the $R_1$, $R_2$, $R_3$, Q, and E groups has at least one unsatisfied valence or bond (not shown), through which each such group is bonded to a separate group Z, the total number of unsatisfied valences or bonds being equal to the value of the integer n. At least one of $R_1$, $R_2$, $R_3$, Q, E, and R, comprises a group that can impart soft hand, stain release, water repellency, or a durable property when the compound is applied to a fibrous substrate with the proviso that any group that can impart stain release is comprised by $R_1$, $R_2$, $R_3$, Q, and/or E.

In other preferred embodiments, this invention provides fluorochemical compositions comprising compounds of Formula III $$(B-Z)_n R \qquad\qquad III$$

wherein B is a fluorochemical oligomeric portion of the formula

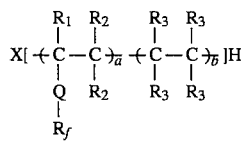

wherein n, a, b, $R_1$, $R_2$, Q, $R_f$, $R_3$, Z, and R are as defined above for Formula I, X is a group derived from a free radical initiator (e.g., t-butoxy); and wherein one of the $R_1$, $R_2$, $R_3$, Q, and X groups has an unsatisfied valence or bond through which the group is bonded to Z. In a compound of Formula III at least one of $R_1$, $R_2$, $R_3$, Q, R, and X comprises a group that can impart soft hand, stain release, water repellency, or a durable property when the compound is applied to a fibrous substrate with the proviso that any group that can impart stain release is comprised by $R_1$, $R_2$, $R_3$, Q, and/or X.

This invention also provides intermediate fluorinated compounds for use in the preparation of the above-described compounds of Formulas I–III. These intermediates are compounds of Formulas IA–IIIA below

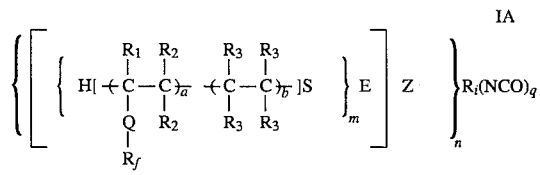

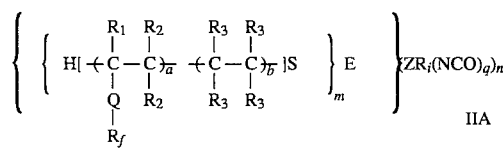

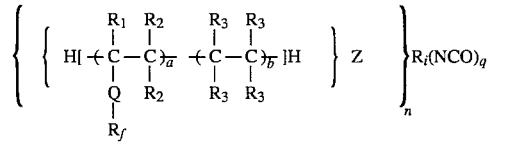

wherein q is an integer from 1 to about 10; $R_i$ is an (n+q)-valent organic group such as 2,4-tolylene; and n, m, a, b, $R_1$, $R_2$, E, Q, $R_f$, $R_3$, X, and Z are as defined above for Formulas I–III. In a compound of Formulas IA or IIA, optionally at least one of $R_1$, $R_2$, R3, Q, and E comprises a group that can impart soft hand, stain release, water repellency, or a durable property when the compound is applied to a fibrous substrate. In a compound of Formula IIIA, optionally at least one of $R_1$, $R_2$, $R_3$, Q, and X comprises a group that can impart soft hand, stain release, water repellency, or a durable property when the compound is applied to a fibrous substrate.

This invention also provides a method of stabilizing an aqueous liquid dispersion, comprising the step of including in the dispersion a fluorochemical emulsifier of Formula IV or IVA

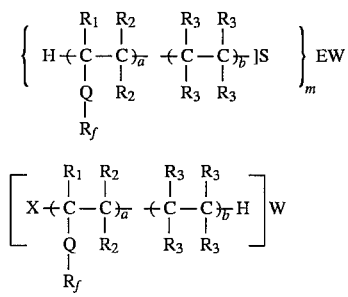

wherein $R_1$, $R_2$, $R_3$, Q, $R_f$, E, X, a, b, and m are as defined above in connection with Formula III (with the obvious proviso that all bonds defined as bonds to Z in Formula III are bonds to W in Formulas IV and IVA), and wherein W represents the hydrophilic portion of 1) an anionic surfactant;
2) a cationic surfactant;
3) a non-ionic surfactant; or
4) an amphoteric surfactant, in an amount effective to stabilize the dispersion. These emulsifiers find particular use in the aqueous dispersions of the invention.

As described above and further illustrated in Formulas I–III, a fluorochemical composition of the invention comprises a fluorinated compound that generally has four principal portions: a fluorochemical oligomeric portion, a non-polymeric isocyanate-derived linking group, an organic moiety, and a group that can impart soft hand, stain release, water repellency, or a durable property when the compound is applied to a fibrous substrate. The fluorochemical oligomeric portion and the organic moiety are linked together by the isocyanate-derived linking group. The isocyanate-derived linking group can result from the reaction of a nucleophile, such as an alcohol, an amine, or a thiol, with an isocyanate or with an isocyanate dimer, trimer, oligomer, or the like. Preferred among such linking groups are ureylene, urethanylene, allophanatylene, biuretylene, guanidinylene, oxazolidinonylene, acylimino, and sulfur analogs thereof.

A salient component of the fluorochemical oligomeric portion is the fluoroaliphatic group, designated herein as $R_f$. A fluorinated compound contains a plurality of $R_f$ groups (e.g., from 2 to about 50) proximal to one another and preferably contains from about 5 percent to about 80 percent, more preferably from about 20 percent to about 65 percent, and most preferably about 25 percent to about 55 percent fluorine by weight based on the total weight of the compound, the loci of the fluorine being essentially in the $R_f$ groups. $R_f$ is a stable, inert, non-polar, preferably saturated, monovalent moiety which is both oleophobic and hydrophobic. $R_f$ preferably contains at least about 3 carbon atoms, more preferably 3 to about 20 carbon atoms, and most preferably about 6 to about 14 carbon atoms. $R_f$ can contain straight chain, branched chain, or cyclic fluorinated alkylene groups or combinations thereof or combinations thereof with straight chain, branched chain, or cyclic alkylene groups. $R_f$ is preferably free of polymerizable olefinic unsaturation and can optionally contain catenary heteroatoms such as oxygen, divalent or hexavalent sulfur, or nitrogen. It is preferred that $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2$—, $(CF_3)_2CF$—, —$CF_2SF_5$, or the like. Perfluorinated aliphatic groups (i.e., those of the formula $C_nF_{2n+1}$) are the most preferred embodiments of $R_f$.

The aliphatic backbone of the fluorochemical oligomeric portion comprises a sufficient number of polymerized units to render the portion oligomeric. The aliphatic backbone preferably comprises from 2 to about 20 polymerized units derived from fluorinated monomers (i.e., monomers containing a fluorinated organic group $R_f$ as defined above), and from 0 to about 20 polymerized units derived from non-fluorinated monomers. In instances where only units derived from fluorochemical monomers are present, it is more preferred that the aliphatic backbone comprise from 2 to about 8, most preferably about 4, polymerized units. In instances where both fluorochemical and non-fluorinated monomers are used, likewise the aliphatic backbone preferably comprises from 2 to about 8, most preferably about 4 units. The ratio of moles of polymerized units derived from fluorochemical monomer to moles of polymerized units derived from non-fluorinated monomer will not be the same in each compound present in a particular composition of the invention. Therefore, such compositions and compounds of the invention can be characterized with respect to the overall ratio of polymerized units derived from fluorochemical monomer to polymerized units derived from non-fluorinated monomer, which is determined primarily by the relative amounts thereof used in the preparation of a composition of the invention. It is preferred that the overall ratio of moles of polymerized units derived from fluorochemical monomer to moles of polymerized units derived from non-fluorinated monomer be from 20:1 to about 1:4, preferably from about 10:1 to about 2:3, and most preferably about 4:1.

The fluorochemical oligomeric portion is linked to the organic portion by a linking group designated as Z in the formulas used herein. Z is a non-polymeric isocyanate-derived linking group that can result from the reaction of a nucleophile such as an alcohol, an amine, or a thiol with an isocyanate or an isocyanate dimer, trimer, oligomer, or the like. Suitable isocyanate-derived linking groups Z include acylimino (—CONH—),

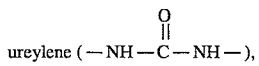

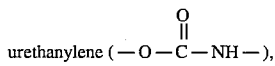

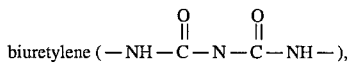

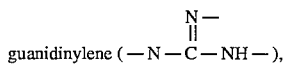

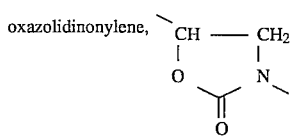

and sulfur analogs thereof. Urethanylene is preferred.

The organic moiety, designated R in compounds of Formulas I–III is a mono-, di-, or polyvalent organic group. In its simplest form, R is a relatively simple group that is present merely as a consequence of the synthetic method used to prepare the compound. For example, R can be methyl in an instance where methyl isocyanate is used in step (2) of either of Reaction Schemes 1 and 2 below, or R can be 2,4-tolylene in an instance where 2,4-toluene diisocyanate is used in step (2) of either of the Reaction Schemes. The range of structures contemplated for the organic moiety will be better understood with reference to the compounds suitable for use in steps (2) and (3) of the Reaction Schemes described in detail below. R can be straight chain, branched chain, or cyclic alkyl or alkylene, alkenyl or alkenylene, aryl or arylene, polyaryl or polyarylene, or any combination thereof (e.g., aralkyl, aralkylene, or a mono, di, or polyvalent polymeric chain) and can optionally include oxygen-containing, silicon-containing, sulfur-containing, nitrogen-containing groups, and combinations thereof (e.g., R can be a mono, di, or polyvalent poly(meth)acrylate chain, or a mono, di, or polyvalent polysiloxane chain). It is preferred that the groups in R be substantially unreactive to isocyanates under conditions conventionally employed to react a nucleophile with an isocyanate.

The organic moiety R can also contain isocyanate-derived moieties such as those described above in connection with linking group Z. Further, R can comprise isocyanate-derived moieties that are formed by the reaction of two or more isocyanates with one another, such as carbodiimidylene (—N=C=N—), diazetidine-2,4-dionylene

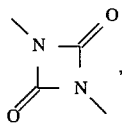

imino-4,6-dioxohexahydro-,3,5-oxdiazinylene

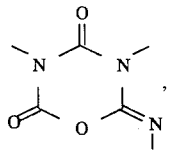

isocyanuratylene

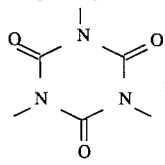

and the like.

A fluorinated compound of the invention also contains a group that can impart soft hand, stain release, water repellency, or a durable property when the compound is applied to a fibrous substrate. A group that can impart stain release is comprised by the fluorochemical oligomer portion. In particular with reference to Formulas I–III, any one or more of Q, $R_1$, $R_2$, $R_3$, E, or X can comprise such a group. It is preferred that groups that can impart soft hand, water-repellency, or a durable property be comprised by the organic moiety R. Such a group, however, can alternatively be comprised by the fluorochemical oligomeric portion. In particular, with reference to Formulas I–III, any one or more of the substituents Q, $R_1$, $R_2$, $R_3$, R, and E or X can comprise such a group.

Any property that can be imparted through the use of fluorochemicals on fibrous substrates can be imparted by the compositions of the invention, and any such property can be rendered a durable property through the use of the compositions of the invention. Durability can be achieved by any of a number of mechanisms of interaction between the fluorinated compound and a substrate. For example, interactions such as physical entanglement, or chemical interaction such as covalent bonding by way of nucleophilic, electrophilic, ionic, free radical or like reactions between the fluorinated compound and the substrate, or ionic bonding, can cause durability. wool, leather, paper, cotton, and nylon variously comprise hydroxyl, amino, carboxyl, and carboxamido groups. Other fabrics such as some non-wovens are essentially non-functional but comprise polymer chains. For the purposes of the instant specification and claims, "a group that can impart a durable property when the compound is applied to a fibrous substrate" designates a group that can interact with a fabric by any of the above-described mechanisms. Such groups can be easily selected by those skilled in the art as a function of the particular fibrous substrate that is intended to be treated with the ultimate composition of the invention. Representative groups suitable for imparting durability include polymerizable olefin, olefin that can undergo a hydrosilation reaction, epoxy, amino, hydroxy, halo, haloformyl, aziridino, acid groups such as carboxy, sulfo, sulfino, sulfeno, dihydroxyphosphinyl, and hydroxyphosphinilidene, alkali metal and alkaline-earth metal salts thereof, amine salts thereof, quaternary ammonium salts thereof and the like, or amino and quaternary ammonium groups and salts thereof with, e.g., the above-listed types of acids. Further, some of the above-described isocyanate derivatives (e.g., carbodiimides) are suitable to interact with some fibrous substrates.

A particularly preferred type of group that imparts a durable property when the compound is applied to a fibrous substrate is a blocked isocyanato, i.e., the reaction product of an isocyanate and a blocking agent, wherein the blocking agent is removable from the isocyanate under the thermal conditions employed upon curing a substrate treated with a compound containing the blocked isocyanato group. Conventional isocyanate blocking agents include arylalcohols (e.g., phenol, cresols, nitrophenols, o- and p-chlorophenol, naphthols, 4-hydroxybiphenyl); $C_2$ to $C_8$ alkanone oximes (e.g. acetone oxime, butanone oxime); arylthiols (e.g., thiophenol); organic active hydrogen compounds (e.g.; diethyl malonate, acetylacetone, ethyl acetoacetate, ethyl cyanoacetate, ε-caprolactam); sodium bisulfite; and hydroxylamine. Particularly preferred blocked isocyanates include those blocked with $C_2$ to $C_8$ alkanone oximes, particularly butanone oxime, as such blocked isocyanates can be de-blocked at a relatively low temperature, for example during the process of curing a substrate that has been treated with the compound comprising the blocked isocyanato group.

In addition to those groups that can impart durability, it is sometimes preferred to incorporate into a fluorinated compound of this invention a group that imparts a soft hand (i.e., a group that improves the softness or "hand") to a substrate treated with a fluorochemical composition of this invention. Such groups are well known to those skilled in the art and include siloxanyl groups such as polymethylphenylsiloxanyl, polydimethylsiloxanyl, and the like. Also, groups that enhance other aspects of performance can be incorporated. For example, long chain alkyl groups can be incorporated in order to improve water repellency, and it is well known to those skilled in the art that polyoxyalkylenyl groups, such as polyoxyethylenyl groups, can be incorporated into fluorochemicals to improve stain release (see generally "Organofluorine Compounds and Their Industrial Applications" by R. E. Banks, p. 229 (Ellis Horwood Limited, 1979).

The fluorinated compounds and fluorochemical compositions of the invention will be illustrated with reference to the embodiments shown in Formulas I–III. In such embodiments, linking group Q links the fluoroaliphatic group $R_f$ to the aliphatic backbone of the fluorochemical oligomeric portion. Linking group Q preferably contains from 1 to about 20 carbon atoms. Q can optionally contain oxygen, nitrogen, sulfur, or silicon-containing groups or a combination thereof, and Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of structure suitable for linking group Q include straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene. Preferred linking groups Q can be selected according to ease of preparation and commercial availability. Below is a partial representative list of suitable Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and $R_2'$ is alkyl of 1 to about 20 carbon atoms.

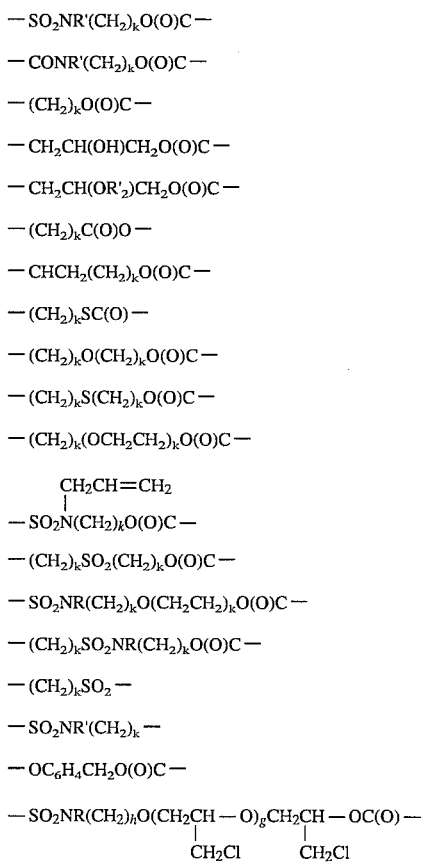

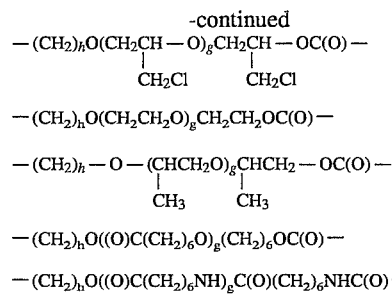

Q is preferably alkylene or sulfonamido, or sulfonamidoalkylene.

Returning now to Formulas I–III above, $R_1$ is hydrogen, halogen (e.g., fluoro, chloro, bromo), or straight chain or branched chain alkyl of 1 to about 4 carbon atoms (e.g., methyl, ethyl, propyl, isopropyl, butyl, isobutyl, and the like).

Each $R_2$ is independently hydrogen or straight chain or branched chain alkyl of 1 to about 4 carbon atoms.

Each $R_3$ is independently hydrogen, halogen, or an organic group that, as discussed above in connection with linking group Q, preferably does not substantially interfere with free-radical oligomerization. Examples of structure suitable for $R_3$ include hydrogen, chloro, alkyl, cycloalkyl, aryl, aralkyl, imino, oxy, oxo, hydroxy, alkylthio, alkoxy, cyano, formyl, acyloxy, amido, sulfonamido, combinations thereof, and the like.

X is a group derived from a free-radical initiator. As used herein, the term "free-radical initiator" designates any of the conventional compounds such as organic azo compounds, organic peroxides (e.g., diacyl peroxides, peroxyesters, dialkyl peroxides) and the like that provide initiating radicals upon homolysis. As used herein, the term "group derived from a free-radical initiator" designates an initiating radical formed upon homolyric decomposition of a free-radical initiator.

Suitable groups X include non-reactive groups such as t-butoxy (derived from di-t-butylperoxide), and benzoyloxy (derived from benzoyl peroxide), and reactive groups such as —C(CH$_3$)(CN)CH$_2$CH$_2$CO$_2$H (derived from azo-4-cyanoisovaleric acid), —C(CH$_3$)$_2$CN (derived from azoisobutyronitrile), and those derived from other known functional azo compounds such as 2,2'-azobis[N-(4-chlorophenyl)-2-methylpropionamidine]-dihydrochloride; 2,2'-azobis[N-(4-hydroxyphenyl)-2-methylpropionamidine]dihydrochloride; 2,2,-azobis[N-(4-aminophenyl)-2-methylpropionamidine]-tetrahydrochloride; 2,2'-azobis[2-methyl-N-2-propenylpropionamidine]dihydrochloride; 2,2'-azobis[N-(2-hydroxyethyl)-2-methylpropionamidine]-dihydrochloride; 2,2'-azobis[2-methyl-N-(2-hydroxyethyl)-propionamide]; 2,2'-azobis[2-(hydroxymethyl)propionitrile]; 2,2'-azobis[2-methyl-N-[1,1-bis(hydroxymethyl)-2 -hydroxyethyl] propionamide]; and 2,2'-azobis{2-methyl-N-[1,1-bis(hydroxymethyl)ethyl]-propionamide}. Preferred groups X include those enumerated above.

Linking group E preferably contains from 1 to about 20 carbon atoms. E can optionally contain oxygen-, nitrogen-, sulfur-, or silicon-containing groups or a combination thereof, and E is preferably free of functional groups that substantially interfere with free-radical oligomerization. Examples of structure suitable for E include straight chain, branched chain or cyclic alkylene, arylene, aralkylene, oxy, oxo, hydroxy, thio, sulfonyl, sulfoxy, imino, sulfonamido, acylimino, acyloxy, urethanylene, ureylene, and combinations thereof. E is preferably alkylene.

As illustrated in Formulas I–III, a compound can contain a plurality of Z groups each bonded to the fluorochemical oligomeric portion through any of $R_1$, $R_2$, $R_3$, Q, X and/or E. In most embodiments, it is preferred that there be 1 group Z in a compound, preferably being bonded to the fluorochemical oligomer portion through group E in a compound of Formulas I or II, or through group X in a compound of Formula III. These embodiments are discussed in detail below in connection with Schemes I and II below. However, in an instance wherein the group R is a mono, di, or polyvalent polymeric chain (e.g., as set forth in Examples 97–100 below), the number of Z groups is preferably greater than 1.

Compositions of the invention can be prepared as shown in Schemes I and II below, wherein n, a, b, q, $R_1$, $R_2$, Q, $R_3$, $R_f$, X, E, $R_i$, and R are as defined above, and $R_5$, $R_6$ G, $R_7$, Y and L generally correspond to $R_1$, $R_2$, Q, $R_3$, X, and E, respectively, absent the proviso that at least one thereof has an unsatisfied valence, and with the proviso that at least one thereof possesses a functional group capable of reacting with an isocyanate or capable of being converted or further elaborated into such a functional group. Products other than those shown in the schemes will be produced by the various steps. The schemes show only the major products of the various steps.

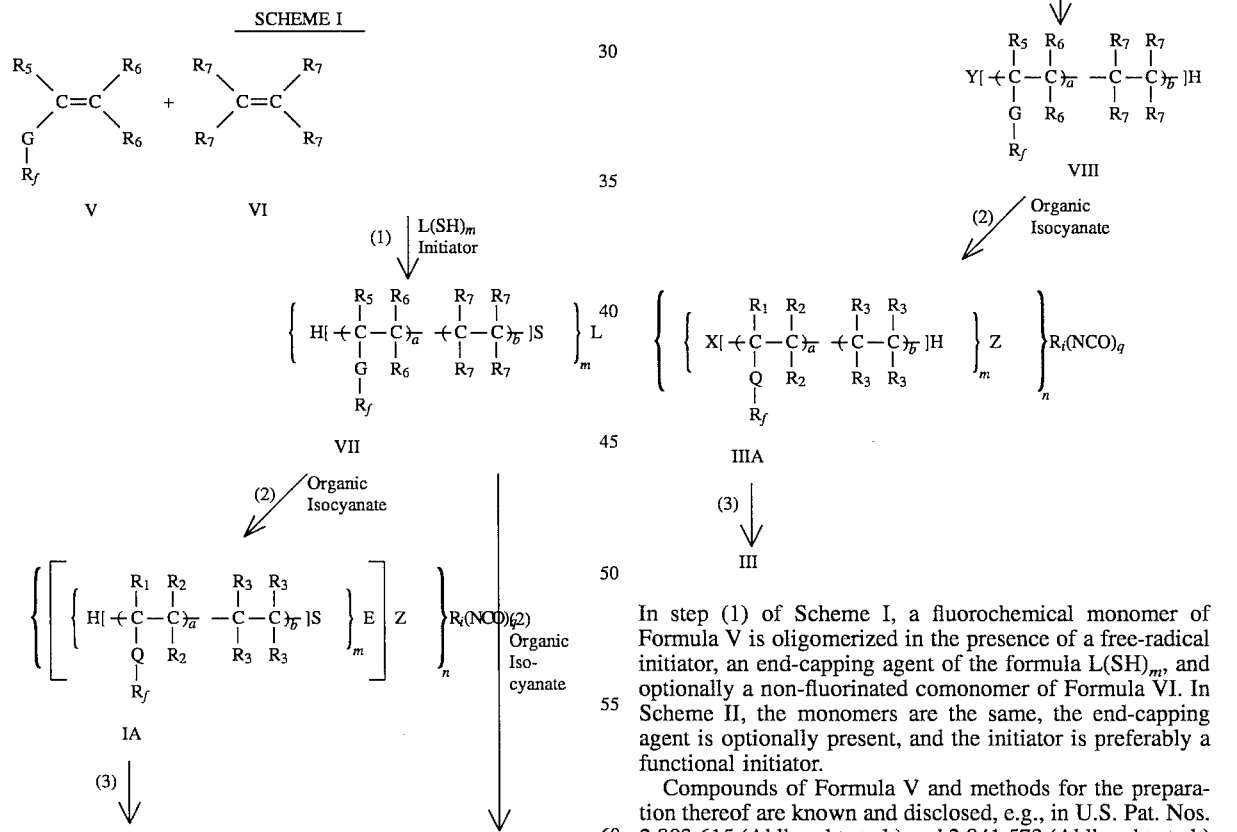

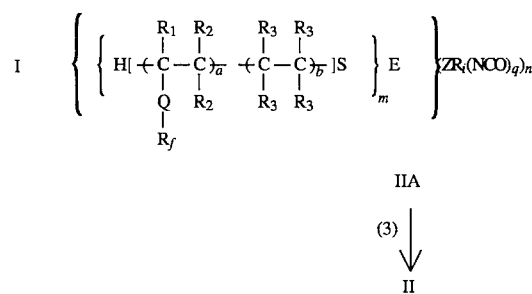

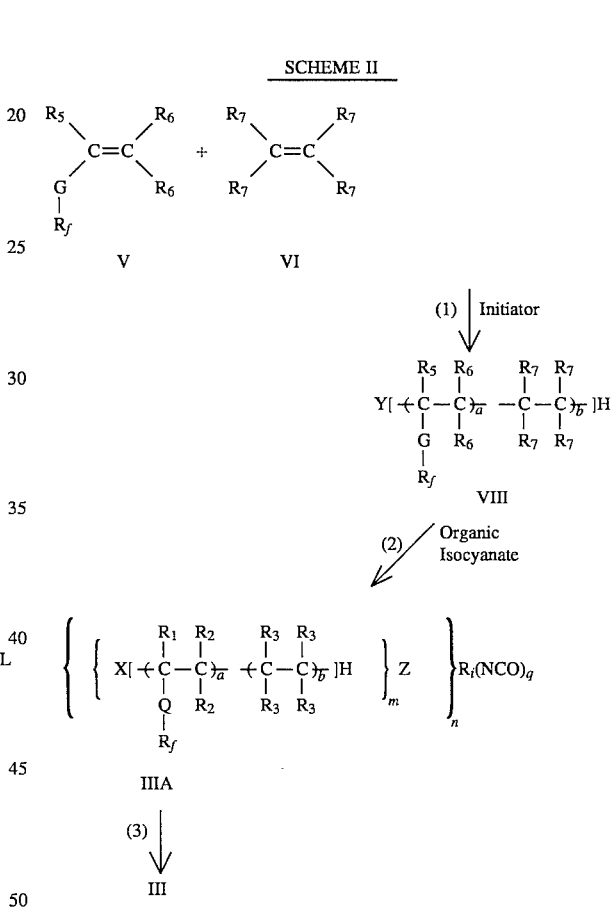

In step (1) of Scheme I, a fluorochemical monomer of Formula V is oligomerized in the presence of a free-radical initiator, an end-capping agent of the formula $L(SH)_m$, and optionally a non-fluorinated comonomer of Formula VI. In Scheme II, the monomers are the same, the end-capping agent is optionally present, and the initiator is preferably a functional initiator.

Compounds of Formula V and methods for the preparation thereof are known and disclosed, e.g., in U.S. Pat. Nos. 2,803,615 (Ahlbrecht et al.) and 2,841,573 (Ahlbrecht et al.) which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds of Formula V include such as N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethyl methacrylate and N-methylperfluorooctanesulfonamidoethyl alcohol, perfluorooctyl acrylate, N-methyl perfluorooctanesulfonamidoethyl vinyl ether, and $C_8F_{17}SO_2NHCH_2CH{=}CH_2$, and others such as perfluorocyclohexyl acrylate, and tetrameric hexafluoropropyleneoxide dihydroacrylate.

Compounds of Formula VI are also well known and generally commercially available. Examples of such compounds include general classes of ethylenic compounds capable of free-radical polymerization, such as lower olefinic hydrocarbons, optionally halogenated, such as ethylene, propylene, isobutene, 3-chloro-2-isobutene, butadiene, isoprene, chloro and dichlorobutadienes, fluoro and difluorobutadienes, 2,5-dimethyl-1,5-hexadiene; vinyl, allyl or vinylidene halides such as vinyl or vinylidene chloride, vinyl or vinylidene fluoride, allyl bromide, allyl chloride, methallyl chloride; styrene and its derivatives such as vinyltoluene, α-methylstyrene, α-cyanomethylstyrene, divinylbenzene, N-vinylcarbazole; vinyl esters such as vinyl acetate, vinyl propionate, vinyl isobutyrate, vinyl succinate, vinyl stearate, divinylcarbonate; allyl esters such as allyl acetate and allyl heptanoate; alkylvinyl or alkylallyl ethers such as cetyl vinyl ether, dodecyl vinyl ether, isobutyl vinyl ether, ethyl vinyl ether, 2-chloroethyl vinyl ether, tetrallyloxyethane; vinyl alkyl ketones such as vinyl methyl ketone; unsaturated acids such as acrylic, α-chloro acrylic, α-fluoro acrylic, crotonic, maleic, fumaric, itaconic, and citraconic acids, and anhydrides and esters thereof such as dimethyl maleate, ethyl crotonate, acid methyl maleate, acid butyl itaconate, and vinyl, allyl, methyl, ethyl, butyl, isobutyl, hexyl, 2-ethylhexyl, chlorohexyl, octyl, lauryl, or stearyl acrylates and methacrylates; olefinic silanes such as vinyltrichlorosilane, vinyltrime thoxysilane, vinyltriethoxysilane, and methacryloyloxypropyl trimethoxysilane; nitriles such as acrylonitrile, methacrylonitrile, 2-chloroacryl onitrile, 2-cyanoethylacrylate, methylene glutaronitrile, vinylidene cyanide, alkyl cyanoacrylates such as isopropyl cyanoacrylate; (tris)-acryloyl-hexahydro-s-triazine; special acrylates such as butanediol dimethacrylate, dicyclopentenyl acrylate, ethoxylated bisphenol A dimethacrylate, isobornyl acrylate and methacrylate, trimethylopropane triacrylate, allyl methacrylate; acrylamides and methacrylamides; mono or di(meth)acrylates of glycols or polyalkylene glycols such as ethylene glycol dimethacrylate, triethylene glycol acrylate, mono, di, and polyacrylates and methacrylates of methoxypolyethylene glycols and polyethylene glycols of various molecular weights (available as CARBOWAX™), block copolymers of ethylene oxide and propylene oxide endcapped by hydroxy groups (available as PLURONIC™), tetramethyleneoxide glycols (available as TERATHANE™), amino or diamino-terminated polyethers (available as JEFFAMINE™); mono, di, and polyacrylates and methacrylates of siloxane mono-, di-, or polyols such as 1,3-bis(4-hydroxybutyl)tetramethyl disiloxane (Petrarch Systems, Bristol, PA); VP-1610 siloxane diol (Wacker-Germany); Q4-3667 siloxane diol (Dow Corning); Q4-3557 siloxane diol (Dow Corning); acrylamides and methacrylamides of siloxane mono, di, or polyamines such as 1,3-bis(γ-aminopropyl)tetramethyl disiloxane (Petrarch Systems); DC-531 siloxane polyamine (Dow Corning); DC-536 siloxane polyamine (Dow Corning); and others described in U.S. Pat. No. 4,728,571 (Clemens et al.), the disclosure of which is incorporated herein by reference.

Compounds of Formula V and Formula VI that possess particular functional groups in G, $R_5$, $R_6$, or $R_7$ can also be used in step (1) to ultimately provide, for example, compounds of Formulas I–III wherein the fluorochemical oligomeric portion of a compound is bonded to linking group Z through Q, $R_1$, $R_2$, or $R_3$. They can also be used to ultimately provide compounds of Formulas I–III that comprise a functional group that can impart a durable property when the compound is applied to a fibrous substrate (or a functional group capable of further elaboration as desired into such a functional group) bonded to the compound through Q, $R_1$, $R_2$, or $R_3$. Examples of such functionalized compounds of Formula VI include N-methylol acrylamide; N-methylol methacrylamide; aziridinyl acrylate and methacrylate; diacetone acrylamide and methacrylamide; methylolated diacetone acrylamide and methacrylamide; 2-hydroxy-3-chloropropyl acrylate and methacrylate; hydroxy ($C_2$ to $C_4$) alkyl acrylates and methacrylates; maleic anhydride; butadiene; isoprene; chloroprene; allyl alcohol; allyl glycolate; isobutenediol; allyloxyethanol; o-allyl phenol; divinyl carbinol; glycerol α-allylether, acrylamide; methacrylamide; maleamide; maleimide; N-cyanoethyl acrylamide; N-isopropyl acrylamide; glyoxal bis-acrylamide; metal salts of acrylic acid and methacrylic acid; vinylsulfonic and styrene p-sulfonic acids and their metal salts; 3-aminocrotonitrile; monoallylamine; vinylpyridines; n-vinylpyrrolidone; 2-acrylamido-2-methylpropanesulfonic acid (AMPS) and its salts; vinyl azlactones; glycidylacrylate and methacrylate; allyl glycidyl ether; acrolein; N,N-dimethylaminoethyl acrylate and methacrylate; N-tert-butylaminoethyl methacrylate; allyl methacrylate; di allyl maleate; vinyltriethoxysilane; vinyltrichlorosilane; and the like.

Whether or not a compound of the invention contains functional groups by virtue of the use of functionalized compounds of Formula V or Formula VI in its preparation, it can be provided (additional) functional groups by way of Scheme I through the use of an appropriate functionalized end-capping agent $L(SH)_m$ as defined above. Suitable functional groups for inclusion in the end-capping agent include hydroxy, amino, halo, epoxy, haloformyl, aziridinyl, acid groups and salts thereof such as those discussed above, quaternary ammonium groups and salts thereof also discussed above, and others that can render a composition durable when applied to a fibrous substrate, react with an isocyanate, or are capable of further transformation into such groups. Examples of such compounds include 2-mercaptoethanol, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptoethyl ether, 2-mercaptoethylsulfide, 2-mercaptoimidazole, 8-mercaptomenthone, 2-mercaptonicotinic acid, 4-hydroxythiopheno3-mercapto-1,2-propanediol, 1-mercapto-2-propanol, 2-mercaptopropionic acid, N-(2-mercaptopropionyl)glycine, 3-mercaptopropyltrimethoxysilane, 2-mercaptopyridine, 2-mercaptopyridine-N-oxide, 2-mercaptopyridinol, 2-mercaptopyrimidine, mercaptosuccinic acid, 2,3-dimercaptopropanesulfonic acid, 2,3-dimercaptopropanol, 2,3-dimercaptosuccinic acid, 2,5-dimercapto-1,3,4-thiadiazole, 3,4-toluenedithiol, o-, m-, and p-thiocresol, 2-mercaptoethylamine, ethylcyclohexanedithiol, p-menthane-2,9-dithiol, 1,2-ethanedithiol, cystsine, cystsin hydrochloride, cystsine ethylester. Preferred functionalized end-capping agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

Non-functionalized end-capping agents are those that contain a group capable of terminating a radical chain reaction (e.g., a thiol) but no further, functional groups capable of reacting with an isocyanate. Such end-capping agents are particularly useful when a functional group that can react with an isocyanate is incorporated through the fluorochemical or non-fluorinated monomer) or through the group X in a compound of Formulas III or IV as described below. Such compounds include mono, di, and polythiols such as ethanethiol, propanethiol, butanethiol, hexanethiol, n-octylthiol, t-dodecylthiol, 2-mercaptoethyl ether, 2-mercaptoimidazole, and the like.

Whether functionalized or not, an end-capping agent is present in an amount sufficient to control the number of polymerized monomer units in the oligomer. The end-capping agent is generally used in an amount of about 0.05 to about 0.5 equivalents, preferably about 0.25 equivalents, per equivalent of olefinic monomer.

Also present in step (1) is a free-radical initiator as defined above in connection with X. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide.

The initiating radical formed by an initiator can be incorporated into the fluorochemical oligomer to varying degrees depending on the type and amount of initiator used. Therefore, a compound of the invention can be functionalized by way of Scheme II through the use of a functionalized initiator. Step (1) of Scheme II can therefore be carried out in the absence of the above-described thiol end-capping agents. Examples of suitable functionalized initiators include those described above in connection with functionalized groups X. Some such initiators are available from Wako Pure Chemical Industries (Osaka, Japan) as VA-548 (phenol-functional), VA-500 (aniline-functional), VR-558 (alkanol-functional), VR-041 (alkylamino-functional), V-601 (ester-functional), and V-501 (acid-functional).

When a compound is to be functionalized via the initiator, it is preferred to use the initiator in an amount such that the molar ratio of initiator to olefinic monomers is between about 0.01 to about 0.5, more preferably between about 0.05 to about 0.25. Otherwise, a suitable amount of initiator depends on the particular initiator and other reactants being used. About 0.1 percent to about 5 percent, preferably about 0.1 percent, to about 0.8 percent, and most preferably about 0.2 percent by weight of an initiator can be used, based on the total weight of all other reactants in the reaction.

Step (1) of either Scheme can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and allcyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™113, trichloroethylene, α,α,α-trifluorotoluene, and the like, and mixtures thereof.

Likewise, step (1) of either Scheme can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The product of step (1), a compound of Formula VII (Scheme I) or VIII (Scheme II), can be elaborated via conventional methods to include further or different functional groups, the product still being within the ambit of the respective formula. For example, a hydroxy-functional compound can be reacted with an epichlorohydrin to provide a further compound with both hydroxy and chloro groups. As a further example, a hydroxy-functional compound can be oxidized by methods known to those skilled in the art to provide an acid-functional compound, or reacted with caprolactam to provide an amine-functional compound also containing an ester group.

In step (2) a compound of Formula VII (Scheme I) or VIII (Scheme II) is reacted with an organic isocyanate to form the linking group Z. Step (2) diverges to afford one of two general classes of compounds. One class, represented by coupounds of Formulas IA and IIIA, is the result of two or more fluorochemical oligomers each independently reacting with an isocyanato group of a single di- or polyisocyanate. The other class, represented by compounds of Formula IIA, is the result of two or more organic isocyanate molecules each independently reacting with a nucleophilic functional group of a single di- or polyfunctional fluorochemical oligomer. Intermediate and final compositions of the invention can be prepared by step (2). An intermediate composition of the invention results if there remain any unreacted isocyanato groups in the product. A final composition of the invention results if the compound used in step (2) contains only one isocyanato group or if all isocyanato groups of a di- or polyisocyanate are reacted, and if the compound used in step (2) contains a functional group that imparts soft hand, stain release, water repellency, or a durable property.

In a case where a monoisocyanate is used in step (2), for example, the reaction of a fluorochemical oligomer that contains only one hydroxyl group with the monoisocyanate affords a urethane as a compound in a final composition of the invention. Derivatives of this urethane, e.g., an allophanate, can also be formed in such a reaction and can also be present in a final composition of the invention. The reaction of a monoamine-functional fluorochemical oligomer with a monoisocyanate affords a urea as a compound that can be present in a final composition of the invention. Derivatives of this urea, e.g., a buiret, can also be formed and can also be present in a composition of the invention. Also, condensation of two moles of an organic isocyanate with loss of $CO_2$ affords a carbodiimide, which can then react with an amine-functional fluorochemical oligomer to form a guanidine that can be present in a final composition of the invention.

In the case of di- and polyisocyanates, the product of step (2) will be an intermediate compound of the invention if there remain unreacted isocyanato groups, or a final compound of the invention if all isocyanato groups have been reacted. As discussed above, urethanes, ureas, allophanates, biurets, guanidines, oxazolidinones, and sulfur anologs thereof can be formed.

Examples of isocyanates suitable for use in step (2) include monoisocyanates such as phenylisocyanate and octadecylisocyanate; aromatic diisocyanates such as 4,4'-methylenediphenylenediisocyanate, 4,6- di-(trifluoromethyl)-1,3-benzene diisocyanate, 2,4- tolunediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; allcyclic diisocyanates such as 3-isocyanatomethyl-3,5,5-trimethylcyclohexylisocyanate; aliphatic diisocyanates such as methylenediisocyanate, 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic polyiisocyanates such as polymethylenepolyphenylisocyanate (PAP I); cyclic diisocyanates such as isophorone diisocyanate (IPDI); isocyanates containing olefinic unsaturation such as isocyanatoethyl methacrylate, bis(2-isocyanato ethyl)-fumarate, methacroyl isocyanate, (1'-isocyanato-1'-methylethyl)-3-(1'-methylethenyl)benzene (available as M-TMI from American Cyanamide), and allylisocyanate. In a product resulting from the use of such an isocyanate in step (2), the olefinic unsaturation can be further elaborated, e.g., by polymerization with another olefin, by a platinum catalyzed hydrosilation reaction with a silicone compound, or by other conventional reactions.

Also useful are isocyanates containing internal isocyanate-derived moieties such as biuret-containing tri-isocyanates such as that available from Mobay as DESMONDUR™ N-100, isocyanurate-containing tri-isocyanates such as that available from Huls AG, Germany, as IPDI-1890, and azetedinedione-containing diisocyanates such as that available from Bayer as DESMONDUR™TT. Also, other triisocyanates such as tri-(4-isocyanatophenyl)-methane (available from Bayer as DESMONDURT™R) are suitable.

When, for example, IPDI-1890 is used as the isocyanate in Step (2), and all isocyanato groups are reacted with a hydroxy-functional oligomeric intermediate of Formula VII, the organic moiety R in the product of Formula I or III can be considered to be the isocyanate-derivative isocyanurate nucleus of the IPDI-1890 and the three isophoronyl substituents thereon; n will be 3; and each Z will be a urethanylene group.

Other suitable types of isocyanates for use in step (2) include siloxane-containing mono, di, or polyisocyanates, which can be prepared by reacting siloxane-containing amines with phosgene and which will afford a composition wherein the organic moiety R comprises a siloxyl moiety. Also, fluorochemical isocyanates such as $F_{17}C_8SO_3$—$(C_6H_4)$—NCO can be used, which will afford a composition wherein the organic moiety R comprises a fluoroaliphatic moiety.

Step (2) is carried out under conventional conditions. Preferably the reaction is run in the presence of a catalyst. Suitable catalysts include tertiary amines such as triethylamine, triethylenediamine, N-methylmorpholine, N,N,N', N'-tetramethyl ethylene diamine, N-methyldiethanolamine; N,N-dialkylalkanolamines; tin salts such as dibutyltin dilaureate, stannous octoate, stannous oleate, tin dibutyldi-(2-ethyl hexanoate), stannous chloride; and others known to those skilled in the art. The preferred catalyst depends on the reactants (e.g., the nature of the nucleophilic functional groups in the fluorochemical oligomer and the aromatic or non-aromatic nature of the isocyanate) and on the particular isocyanate derivative that is the intended product of the reaction. For example, tin catalysts such as stannous octoate are preferred in the preparation of urethanes, while allophanate formation can be catalysed by amines such as triethylamine. Urea formation can be carried out in the absence of catalyst. The amount of catalyst present will depend on the particular reaction, and thus it is not practical to recite particular preferred concentrations. Generally, however, suitable catalyst concentrations are from about 0.001 percent to about 10 percent, preferably about 0.1 percent to about 5 percent, by weight based on the total weight of the reactants.

Step (2) is preferably carried out under dry conditions in a polar solvent such as ethyl acetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 200° C.

In step (3) of Schemes I and II, an intermediate of Formula IA, IIA, or IIIA is reacted to form a compound of Formula I, II, or III respectively. As described above, the group R of a compound of Formula I, II, or III can contain blocked isocyanato group(s). To prepare such compounds, an intermediate of Formula IA, IIA, or IIIA can be reacted with an isocyanate blocking agent, e.g., an oxime such as acetone oxime, to afford the blocked isocyanato group.

Another method (not shown in the Schemes) of preparing a compound of this invention wherein the organic moiety R contains a blocked isocyanato involves (1) blocking the isocyanato group of an isocyanate-functional monomer such as isocyanatoethyl methacrylate to afford a blocked monomer; (2) oligomerizing the blocked monomer in the presence of an appropriate functional end-capping agent to provide a functional blocked oligomer containing blocked isocyanato groups and a functional group capable of reacting with an isocyanate; (3) reacting a deficiency of the functional oligomer with an organic di- or polyisocyanate to afford an isocyanato-containing intermediate compound also containing blocked isocyantato groups; and (4) reacting the remaining isocyanate groups of the product with a fluorochemical oligomer of Formula VII or VIII to form a linking group Z. In such a compound, the organic moiety R includes the blocked oligomer formed in step (2) with the organic nucleus of the di- or polyisocyanate used in step (3) bonded thereto through the isocyanate-derived group formed in step (3); z is the isocyanate-derived linking group formed in step (4); and the remainder of the compound is as defined for Formula VII or VIII above.

Organic moiety R can contain other types of groups. Such can be introduced in step (3) by, for example, reacting an isocyanate of Formulas IA, IIA, or IIIA with a reagent containing a group reactive to an isocyanate. When a reagent containing two or more reactive functional groups is used in such a reaction, at least one of the functional groups has a substantially lesser degree of reactivity with isocyanates than the others. The less reactive group will generally remain unreacted. Examples of reagents suitable for use in step (3) include acids such as lauric acid, palmitic acid, stearic acid, oleic acid, sorbic acid, linoleic acid, oxalic acid, succinic acid, adipic acid, benzoic acid, phthalic acid, terephthalic acid; fluorochemical alcohols, amines, and thiols such as those disclosed, for example, in U.S. Pat. Nos. 2,666, 797 (Husted), 2,691,043 (Husted), 3,398,182 (Guenther eta 1.), and 4,606,737 (Stern) the disclosures of which are incorporated herein by reference; functionalized alcohols and amines such as glycidol, aziridine, 2-methylaziridine, 2-chloroethanol, 1,3-dichloropropanol, 2,3-dibromopropanol, and 1-chloro-2,3-propanediol; mono, di, or polyfunctional siloxanes such as Dow Corning Q4-3667 (diol), Dow Corning x-2-8024 (dimercaptan), Dow Corning 1248 (polyol), Dow Corning Q4-3557 (polyol), Dow Corning 8026 (polyol), Dow Corning 531 and 5 36 (polyamines); poly(epichlorohydrin) mono-, di-, or triols (such as those available as PECH™, 3M); hydroxyacids such as malic acid, glyoxal, 12-hydroxystearic acid, citric acid, tartaric acid, dimethylolacetic acid, dimethylolpropionic acid, p-hydroxybenzoic acid; aminoalcohols such as triethanolamine, N,N-dimethylaminoethanol, methyldiethanolamine, ethyldiethanolamine, aminosulfonic acids such as 4-(2-hydroxyethyl)-1-piperazineethane sulfonic acid, taurine; amino acids such as 6-aminocaproic acid; mono, di, or polyalcohols such as methanol, ethanol, butanol, 2-ethylhexanol, stearylalcohol, ethylene glycol, glycerol, 1,2,4-butanetriol, pentaerythritol, 1,4-butanediol, 1,6- hexanediol, 1,10-decanediol; mono, di, or polyamines such a s butylamine, dibutylamine, dihexylamine, ethylenediamine, 1,6-hexanediamine, diethylenetriamine, trieethylenetetramine, tetraethylenepentaamine; telomers and functionalized oligomers such as oligomers of acrylates or methacrylates endcapped with a functional end-capping agent capable of reacting with an isocyanate.

A particular embodiment of a compound of Formulas I–III comprises an acid salt moiety. This moiety can be incorporated into the organic moiety R by reacting an isocyanate-containing intermediate with a reagent (e.g., an appropriate reagent such as a hydroxy acid selected from those listed above) containing at least one isocyanate-reactive group and at least one acid moiety capable of salt formation.

Reagents (e.g., an appropriate reagent selected from those listed above, such as triethanolamine) that have more than one isocyanate-reactive group can be used in step (3). The resulting product will have an increased molecular weight relative to the product of a like reaction with a reagent with only one isocyanate-reactive group. This increased molecular weight decreases the water-solubility and dispersability of the compound and often enhances durability of the compound when it is used as described below as a treatment for a fibrous substrate.

A further method of increasing molecular weight in step (3) involves condensation of an isocyanate-containing intermediate of Formula IA or IIIA to form, for example, a carbodiimide, a polycarbodiimide wherein the carbodiimide group is a repeating unit in an oligomeric chain, or an isocyanurate. In the case of carbodiimide formation for example, the organic moiety R in the carbodiimide-containing product can be considered to comprise the carbodiimide moiety and the $R_i$ groups that were present in the compound of Formula IA or IIIA that was condensed to form the carbodiimide; n will be 2; and the remainder of the compound will be as defined for the compound of Formula IA or IIIA. Methods for preparing carbodiimides are known and disclosed, e.g., in U.S. Pat. No. 4,024,178 (Landucci) the disclosure of which is incorporated herein by reference.

When a composition of the invention is applied as a treatment to a fibrous substrate, e.g., a fabric intended for use in a garment, it is preferred that a treated substrate comprise about 0.1% to about 1% by weight of a fluorinated compound of the invention, based on the weight of the untreated substrate.

Knowing the amount of compound intended to be incorporated on the substrate, the percent pick-up of the substrate, and the mass of the substrate, a composition of the invention can be applied to a substrate by any suitable method. For example, a composition can be prepared in the form of an aqueous dispersion and the substrate treated therewith. A dispersion will generally contain water, a fluorinated compound of the invention in an amount effective to provide repellent properties to a substrate treated therewith, and an emulsifier in an amount effective to stablilize the dispersion. Water is preferably present in an amount of about 70 to about 900 parts by weight based on 100 parts by weight of the fluorinated compound of the invention. The emulsifier is preferably present in an amount of about 1 to about 25 parts by weight, preferably about 5 to about 10 parts by weight, based on 100 parts by weight of the fluorinated compound of the invention. Conventional cationic, nonionic, anionic, and zwitterionic emulsifiers are suitable. Cationic emulsifiers are preferred.

As described above, intermediate compounds of Formula IV and IVA are useful as emulsifiers in the stabilization of aqueous dispersions. (Suitable amounts of the components of such a dispersion are as set forth above in connection with aqueous dispersions of the invention). A fluorochemical emulsifier of Formula IV or IVA comprises a group W, wherein W represents the hydrophilic portion of an anionic, cationic, non-ionic or amphoteric surfactant. Representative groups W include —$CO_2H$ and —$SO_3H$ and salts thereof; —$(CH_2CH_2O)_c$ and —$(CH_2CH_2O)_c$—$(CH_2CHCH_3O)_d$—$(CH_2CH_2O)$—. H, wherein c+d+e is greater than about 20;

$$-\overset{+}{N}H_2CH_2CH_2CH_2-\overset{-}{SO_3};$$

and quaternary ammonium groups. Other alternatives for W are well known to those skilled in the art and are discussed in *Encyclopedia of Surface Active Agents,* Volume 1, pp. 1–123, 1951, Chemical Publishing Company, Inc., N.Y.

In order to effect treatment of a substrate, the substrate can be immersed in the dispersion and agitated until it is saturated. The saturated substrate can then be run through a padder/roller to remove excess dispersion, dried in an oven at a relatively low temperature (e.g., 70° C.) for a time sufficient to remove the dispersion medium (e.g. water, ethylene glycol, or a mixture thereof), and cured at a temperature and for a time sufficient to provide a cured treated substrate. This curing process can be carried out at temperatures between 40° C. and about 200° C. depending on the particular composition used. In general, a temperature of about 150° C. for a period of about 10 minutes is suitable. The cured treated substrate can be cooled to room temperature and used as desired, e.g., incorporated or fashioned into a garment such as rainwear.

In order to improve the fixing of a fluorinated compound of the invention to a substrate, it is sometimes advantageous to include in the dispersion certain additives, polymers, thermo-condensable products and catalysts capable of promoting interaction with the substrate. Among these are the condensates or precondensates of urea or of melamine formaldehyde (sometimes referred to herein as resins).

If it is desired to increase the hydrophobic character of a substrate to be treated with a composition of the invention, it is possible to use in combination with the composition of the invention certain fluorine-free extenders such as paraffin; compositions containing alkylketenes or derivatives thereof; siloxanes; chlorohydrates of stearamido-methylpyridinium; condensates of fatty acids with melamine or urea derivatives (such as the product obtained on reacting stearic acid with hexamethoxymethylmelamine); condensates of fatty acids with polyamines (such as the reaction product of stearic acid with diethylenetriamine) and their epichlorohydrin adducts; polymers and copolymers of acrylates, methacrylates, maleic anhydride, olefins, or halogenated olefins; isocyanate derivates such as oxime-blocked urethanes and isocyanurates; and the like. It is also possible to use salts of inorganic or organic acids such as aluminum stearate, zirconium acetate, zirconium oxychloride or Werner complexes such as chromium stearatochloride.

If it is desired to improve the softness or "hand" of a substrate treated with a composition of the invention, it is possible to use fluorine-free softeners, such as certain polyethylenes, polydimethylsiloxanes, modified hydrogenalkylpolysiloxanes, or other materials known to those skilled in the art.

It is also possible to use a composition of the invention in combination with other fluorinated products or with polymers or auxiliary products such as polyglycols, colloids such as starch, dextrin, casein, sizing agents, fixing or retaining agents, materials to improve stain resistance, cleaning ability, fire proofing or antistatic properties, buffering agents, fungicidal agents, optical bleaching agents, sequestering agents, mineral salts, surface-active agents, or swelling agents to promote penetration. Particular suitable auxiliary products and amounts thereof can be easily selected by those skilled in the art.

Besides application in oilproofing and waterproofing substrates, and in providing anti-adhesion properties, the compositions of the invention can also be used to protect substrates against solvents or certain aggressive chemicals. They can be used on textiles, paper, or leather in order to impart properties such as stain resistance, soil resistance, soil release, and stain release. They can also be used for obtaining particular properties such as antistatic, antipilling, mold release, corrosion inhibition or anti-fouling properties.

Substrates treated with compositions of the invention were tested by the test methods set forth below.

Water Spray Test (SR)

The resistance of a treated substrate to wetting with water was measured using AATCC Test Method 22-1977, "Water Repellency: Spray Test" as described in *American Association of Textile Chemists and Colorists Technical Manual*, 1977, 53, 245. Samples are rated on a scale of 0 to 100, with 0 indicating complete wetting of the upper and lower surfaces of the substrate and with 100 indicating no wetting.

Water Repellency Test (WR)

The water repellency of treated samples was measured using a water/isopropyl alcohol test and is expressed in terms of a water repellency rating (0–10) of the treated fabric. Treated fabrics that are resistant to water only are given a rating of W. Treated fabrics that are wetted by water are given a rating of 0, whereas treated fabrics resistant to isopropyl alcohol (the most penetrating of the test solutions) are given a rating of 10. Intermediate values are determined by use of other water/isopropyl alcohol mixtures, in which the percentage amounts of water and isopropyl alcohol are each multiples of 10. The water repellency rating corresponds to the amount of isopropyl alcohol in the most penetrating mixture .that does not penetrate or wet the fabric after 10 seconds contact.

Oil Repellency Test (OR)

The oil repellency of a substrate treated with a compound of the invention was measured using AATCC Test Method 118–1975, "Oil Repellency: Hydrocarbon Resistance Test" as described in *AATCC Technical Manual*, 1977, 53, 223. This test measures the resistance of a substrate to wetting by a series of hydrocarbon liquids with a range of surface tensions. The values reported range from 0 (least repellent) to 8 (most repellent).

Abrasion Oil Repellency

A sample of treated fabric (at least 5 cm×12.7 cm) is secured to the base of an AATCC crockmeter with a 20 cm strip of double-coated adhesive tape such that the long dimension of the sample is parallel to the direction of rubbing. A new abrasive disk (WETORDRY TRI-M-ITE™ adhesive paper #600, 3M) is affixed to the rubbing finger of the crockmeter. The rubbing finger is then lowered onto the sample and the sample is abraded by making 20 turns of the crockmeter handle at a rate of 1 turn per second. The sample is removed, allowed to stand for 15 minutes, and tested for oil repellency according to the method set forth above.

Laundering Procedure

The procedure set forth below was used to prepare treated substrate samples designated in the examples below as "5× Laundered".

A 230 g sample of generally square, 400 $cm^2$ to about 900 $cm^2$ sheets of treated substrate was placed in a conventional washing machine along with a ballast sample (1.9 Kg of 8 oz fabric in the form of generally square, hemmed 8100 $cm^2$ sheets) Conventional detergent ("TIDE" 46 g) is added and the washer is filled to high water level with hot water (49° C.±3° C.). The substrate and ballast load is washed five times using a 12-minute normal wash cycle and the substrate and the ballast are dried together in a conventional clothes dryer set on the "heat" setting for about 45 minutes. The dry substrate is pressed using a hand iron set at the temperature recommended for the particular substrate fabric.

Dry Cleaning Procedure

Substrate samples designated in the examples below as "Dry Cleaned" were treated as set forth in AATCC Test Method 7-1975, note 8.1.

Impact Penetration

Impact penetration is measured using the AATCC 42-1964 test as set forth below.

A sample of the treated substrate, 18 cm×33 cm is clamped under a spring clip at the top of a 45° inclined stand and the other end is clipped with a 454 g weighted spring slip to hold the substrate taut. A standard, pre-weighed blotter is inserted beneath the test substrate. A 500 mL volume of distilled water at 27° C. is poured into a funnel fitted with a spray nozzle. The nozzle is 61 cm above the center of the substrate. Upon completion of the spraying period, the blotter is reweighed and the increase in weight is recorded. Results represent the average of four independent determinations.

Stain Release (Kaydol or Stain E)

A sample of a treated substrate (20 cm×70 cm minimum size, 30 cm×30 cm maximum size) is placed on a blotter. Five drops of each of the indicated staining oils, KAYDOL™(Witco Chemical Co.) and 3M Stain E (3M), are placed on separate portions of the substrate.

The resulting puddles of oil are each covered with a piece of glassine film, and a 2.27 kg (5 lb.) weight is placed over each piece of film directly over the oil and allowed to stand for 60 seconds. The weights and films are removed, and the substrate is hung for 15–60 minutes.

A ballast load of untreated substrate (1.4 kg, 3 pounds) is placed in a conventional washing machine. Detergent ("TIDE" 100g) is added, and the washer is filled to high water level with water at 120°±5° C. The washer is started with a 12 minute normal wash cycle, and the treated stained substrate samples are added in order to bring the total weight of the load to 1.8±0.2 kg. After the spin cycle, the treated stained samples are separated and dried in a conventional clothes dryer for about 20 minutes at about 70° C. Within 4 hours of drying, the samples are rated according to the 3M Stain Release Rating Scale.

Other tests used in the examples below include "Water Absorptiveness of Nonbibulous Paper and Paperboard" TAPPI-T441-os-77. This test is designated herein as the Cobb Test, and the results are reported as the weight of water absorbed per square meter of a substrate treated with a compound Also, the "Kit Test" TAPPI Useful Method 557, is used herein as a measure of organophobicity of a substrate when treated with a compound. As a measure of water repellency under conditions simulating heavy rain Deutsche Industrie Norm (DIN) 53-888 is used. This test is referred to herein as the Bundesman Test. For leather treatments, DIN 53-338 is used to determine water absorption and penetration in a treated leather substrate under dynamic conditions. This test is referred to herein as the Bally Penetrometer Test.

The following describes the preparation of intermediates that are used to prepare compounds of the invention in the examples that follow. All reactions were carried out under a nitrogen atmosphere unless otherwise indicated. All parts and percentages are by weight unless otherwise indicated.

Intermediates I1–I15

Into a dry 500 mL three-necked flask fitted with a condenser, a stirrer, a thermometer, and nitrogen gas inlet and outlet, was placed 3.9 g (0.05 mol) 2-mercaptoethanol as an end-capping agent, 122 g (0.2 mol) N-methyl perfluorooctanesulfonamidoethylacrylate (MeFOSEA) as a fluorochemical monomer, 0.91 g azoisobutyronitrile (AIBN) as an initiator, and 294 g ethyl acetate. The resulting reaction mixture was heated to 40° C. and deaereated three times using a vacuum aspirator and nitrogen pressure. The deaereated solution was heated at reflux (about 80° C.) for 15 hrs. A clear, slightly yellow solution was obtained. Analysis of the reaction mixture by gas chromatography indicated that substantially no starting materials remained unreacted. Upon cooling to room temperature, a light yellow precipitate formed. The reaction mixture was poured into 1000 mL of heptane. A white precipitate formed and was filtered, washed with water (200 mL), and heptane (200 mL) and dried in vacuo at room temperature to provide Intermediate I1 as a white powder.

Intermediates I2 to I5 and I7–I15 were prepared using the general procedure used to make Intermediate I1, with the fluorochemical monomers, end-capping agents and molar ratios thereof set forth in Table I, wherein MeFOSEA represents N-methylperfluorooctanesulfonamidoethyl acrylate; EtFOSEMA represents N-ethylperfluorooctanesulfonamidoethyl methacrylate; Hoe T3605 (Hoechst, West Germany) represents $C_nF_{2n+1}CH_2CH_2OCCH=CH_2$ (n ranging from 6 to 12); MeFOSEVE represents N-methylperfluorooctanesulfonamidoethyl vinyl ether; FOSAl represents N-propenyl perfluorooctanesulfonamide; and MeFHSEA represents N-methyl perfluorohexylsulfonamidoethyl acrylate. Intermediate I6 was prepared as follows:

Preparation of Intermediate I6

A functionalized fluorochemical oligomer containing a urethane linking group was prepared. Into a 500 mL three-necked flask fitted with a reflux condenser, a thermometer, and a stirrer, were placed 55.7 g (0.1 mol) of N-methylperfluorooctanesulfonamidoethanol (MeFOSE, $C_8F_{17}SO_2N(CH_3)$—$CH_2$—$CH_2OH$), 15.5 g isocyanatoethylmethacrylate (IEM, 0.1 mol), 30 g of ethyl acetate, 2 drops of stannous octoate and 300 ppm phenothiazine. The mixture was heated to gentle reflux (about 78° C.) for 4 hrs. No residual unreacted isocyanate could be detected by infrared spectrophotometry. The resulting clear yellow solution was cooled to about 25° C. 1.95 g of 2-mercaptoethanol (0.025 mol), 30 g ethyl acetate and 0.54 g AIBN were added. The solution was degassed 3 times at a temperature of about 50° C. using a vacuum aspirator and nitrogen pressure. The degassed solution was heated at reflux for 16 hrs. A clear yellow solution containing Intermediate I6 was obtained.

TABLE I

| Intermediates | Fluorochemical Monomer | End-Capping Agent | Molar Ratio |
|---|---|---|---|
| I2 | MeFOSEA | HSCH$_2$CH$_2$OH | 2/1 |
| I3 | MeFOSEA | HSCH$_2$CH$_2$OH | 8/1 |
| I4 | MeFOSEA | HSCH$_2$CH$_2$OH | 15/1 |
| I5 | MeFOSEA | HSCH$_2$CH$_2$OH | 40/1 |
| I6 | MeFOSE-IEM | HSCH$_2$CH$_2$OH | 4/1/1 |
| I7 | MeFOSEA | HSCH$_2$CH(OH)CH$_2$OH | 4/1 |
| I8 | EtFOSEMA | HSCH$_2$CH$_2$OH | 4/1 |
| I9 | MeFOSEA | HS(CH$_2$)$_{11}$OH | 4/1 |
| I10 | MeFOSEVE | HSCH$_2$CH$_2$OH | 2/1 |
| I11$^A$ | FOSAl | HSCH$_2$CH$_2$OH | 2/1 |
| I12 | MeFHSEA | HSCH$_2$CH$_2$OH | 4/1 |
| I13 | MeFOSEA | HSCH$_2$COOH | 4/1 |
| I14$^B$ | MeFOSEA | HSCH$_2$CH$_2$NH$_2$ | 4/1 |
| I15 | Hoe T3605 | HSCH$_2$CH$_2$OH | 4/1 |

$^A$4% by weight of initiator was used based on the weight of fluorochemical monomer.
$^B$N,N-dimethylformamide was used as solvent.

Intermediates I16–I29

Using the general procedure described for Intermediate I1, further intermediates were prepared by co-oligomerization of fluorochemical monomers and fluorine-free monomers, containing no reactive functionalities other than their polymerizable double bond. The reactants used and relative amounts thereof are shown in Table II below, wherein MeFOSEA is as defined above; isoBMA represents isobutylmethacrylate, EHMA represents 2-ethylhexylmethacrylate; ODMA represents octadecylmethacrylate; VCl$_2$ represents vinylidinechloride; telomer acrylate represents $C_nF_{2n+1}CH_2CH_2O(O)CCH=CH_2$ made by the procedure set forth below; CW750A represents the acrylate formed by esterification of CW750 (a methoxypolyethyleneglycol monoalcohol, available from Union Carbide) with acrylic acid as described in U.S. Pat. No. 4,624,889 (Bries), the disclosure of which is incorporated herein by reference, and PDMS methacrylate represents a polydimethylsiloxane methacrylate of the formula

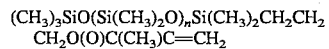

with a molecular weight of about 10,000, described in U.S. Pat. No. 4,728,571 (Clemens etal.), the disclosure of which is incorporated herein by reference, and "telomer acrylate" as used in I21 was prepared as follows:

Preparation of telomer acrylate

Into a 3L three-necked flask fitted with a reflux condenser, a stirrer, and a thermometer, was placed 585 g (1 mol) of a fluoroaliphatic tetrahydroiodide of the formula $C_nF_{2n+1}CH_2CH_2I$ with an average composition of about 5% n=6, about 65% n=8, about 20% n=10, and about 10% n=12 or higher (available from Asahi Glass Co., Japan). The average chain length is about 8.8. The average molecular weight of the tetrahydroiodide is about 585. 792 g (8 mol) of N-methylpyrrolidinone and 72 g (4 mol) of water were also added. The reaction mixture was heated to reflux. The reaction was continued for 40 hrs at reflux during which time the temperature rose to 122° C. A yellow/brown solution was obtained. After cooling to about 80° C., 700 g of water was added and the organic layer was separated. Gas chromatography indicated the conversion of 94% to the fluoroaliphatic tetrahydroalcohol $C_nF_{2n+1}CH_2CH_2OH$ and about 3% of the residual fluoroaliphatic tetrahydroiodide.

The alcohol was steam distilled from the crude reaction mixture to afford 380 g of a colorless waxy solid. The average chain length of the steam distilled alcohol as determined by gas chromatography was about 8, corresponding to an average molecular weight of 453.

Into a 1L three-necked flask fitted with a reflux condenser, and a thermometer, were placed 226.5 g of steam distilled fluoroaliphatic tetrahydroalcohol (0.5 mol) prepared above, 55.5 g of dry triethylamine (0.55 mol), 100 ppm of 4-methoxyphenol and 50 g methyl ethyl ketone. Through an addition funnel under a nitrogen atmosphere, 49.5 g (0.55 mol) of acryloyl chloride were added over a 2 hr period. The temperature of the reaction mixture was allowed to rise to about 40° C. and kept there by adjusting the rate of addition. After the addition was completed, the reaction temperature was raised to 60° C. and kept there for 1 hour. After the reaction was ended, the reaction mixture was washed with water (5×200 mL) at about 50° C. About 228 g of fluoroaliphatic tetrahydroacrylate was obtained. Gas chromatography indicated about 95% conversion to acrylate, the rest being mainly unreacted alcohol. Yield of the esterification was about 90%. The calculated average molecular weight of the fluoroaliphatic tetrahydroacrylate was about 507.

TABLE II

| Intermediate | Components | Molar Ratios |
|---|---|---|
| I16 | MeFOSEA/isoBMA/HSCH$_2$CH$_2$OH | 3.2/0.8/1 |
| I17 | MeFOSEA/isoBMA/HSCH$_2$CH$_2$OH | 2.4/1.6/1 |
| I18 | MeFOSEA/isoBMA/HSCH$_2$CH$_2$OH | 1.6/2.4/1 |
| I19 | MeFOSEA/isoBMA/HSCH$_2$CH$_2$COOH | 3.2/0.8/1 |
| I20$^A$ | MeFOSEA/isoBMA/HSCH$_2$CH$_2$NH$_2$ | 3.2/0.8/1 |
| I21 | telomer acrylate/isoBMA/HSCH$_2$CH$_2$OH | 3.2/0.8/1 |
| I22 | MeFOSEA/EHMA/HSCH$_2$CH$_2$OH | 3.2/0.8/1 |
| I23 | McFOSEA/ODMA/HSCH$_2$CH$_2$OH | 3.2/0.8/1 |
| I24 | MeFOSEA/HSCH$_2$CH$_2$OH | 2.6/1.4/1 |
| I25 | MeFOSEA/VCl$_2$/ODMA/HSCH$_2$CH$_2$OH | 2.6/4.4/1.2/1 |
| I26 | MeFOSEA/CW75OA/HSCH$_2$CH$_2$OH | 4/8/1 |
| I27 | MeFOSEA/PDMS methacrylate/HSCH$_2$CH$_2$OH | 4/x$^B$/1 |
| I28$^A$ | MeFOSEA/PDMS methacrylate/HSCH$_2$CH$_2$NH$_2$ | 4/x$^B$/1 |
| I29 | MeFOSEA/PDMS methacrylate/HSCH$_2$CH$_2$COOH | 4/x$^B$/1 |

$^A$N,N-dimethylformamide used as solvent
$^B$the silicone monomer was used in such an amount corresponding to 25% by weight based on the weight of the fluorochemical monomer Intermediates I30–I35

Using the general procedure described for Intermediate I1, further intermediates were prepared by co-oligomerization of fluorochemical monomers and functionalized fluorine-free monomers. The results are shown in Table III below, wherein MeFOSEA is as defined above; GMA represents glycidyl methacrylate; NMAM represents N-methylol acrylamide; HOEA represents hydroxyethyl acrylate; MAA represents methacrylic acid; and AMPS represent 2-acrylamido-2-methyl-1-propanesulfonic acid.

TABLE III

| Intermediate | Components | Molar Ratios |
|---|---|---|
| I30 | MeFOSEA/GMA/HSCH$_2$CH$_2$OH | 4/0.9/1 |
| I31 | MeFOSEA/NMAM/HSCH$_2$CH$_2$OH | 4/0.4/1 |
| I32 | MeFOSEA/HOEA/HSCH$_2$CH$_2$OH | 4/1/1 |
| I33 | MeFOSEA/HOEA/n-octylthiol | 4/1/1 |
| I34 | MeFOSEA/MAA/HSCH$_2$CH$_2$OH | 3.2/0.8/1 |
| I35$^A$ | MeFOSEA/AMPS-Na$^+$ salt/HSCH$_2$CH$_2$OH | 4/1/1 |

$^A$N,N-dimethylformamide used as a solvent

Intermediates I36–I38

This procedure describes the reaction of a hydroxy-functionalized fluorochemical oligomer with ethylene oxide.

Into a dry 500 mL three-necked flask fitted with a reflux condenser, a Dean Stark trap, a stirrer, and a thermometer, was placed 50.4 g of Intermediate I1 (0.02 mol) and 60 g methyl ethyl ketone; 20 g of solvent was distilled into the Dean Stark trap. The reaction mixture was cooled to 40° C. under nitrogen; 0.15 mn of BF$_3$-etherate complex were added; the-Dean Stark trap and reflux condenser were replaced by a Dewar condenser containing a dry ice/acetone mixture. The Dewar condenser was vented to a gas bubbler to monitor the release of unreacted ethylene oxide; 13.2 g of ethylene oxide gas (0.3 mol) was bubbled slowly over about 1 hr into the reaction mixture. After all ethylene oxide was added, the reaction mixture was slowly heated up to 70° C. and kept there for 3 hrs. No unreacted ethylene oxide could be observed. 0.5 mL hydrogen peroxide and 1 mL 50% NaOH were added to quench the remaining catalyst. The resulting reaction mixture contained Intermediate I36.

Following this procedure, intermediates were prepared from the reactants listed in Table IV, wherein the underscored molar ratio numbers refer to the molar ratio used in the preparation of the intermediate listed in the "Components" column.

TABLE IV

| Intermediate | Components | Molar Ratios |
|---|---|---|
| I36 | Intermediate I1 ethylene oxide | 4/1/15 |
| I37 | Intermediate I16 ethylene oxide | 3.2/0.8/1/4 |
| I38 | Intermediate I1 epichlorohydrin | 4/1/3 |

Intermediate I39

This procedure describes the reaction of an amine-functionalized fluorochemical oligomer with ε-caprolactam to afford a chain-extended intermediate.

Into a 500 mL three-necked flask with a stirrer, a thermometer, and a reflux condenser, were placed 64.4 g of Intermediate I20 (0.03 mol), 3.4 g ε-caprolactam (0.03 mol), and 30 g dry N,N-dimethylformamide. The reaction was heated at 100° C. for 3 hrs. A yellow/brown solution containing Intermediate I39 was formed. This intermediate is the amidoamine adduct formed from ring opening ε-caprolactam with the amine functionality of Intermediate I20.

Intermediate I40

Into a 500 mL three necked flask fitted with a stirrer, a thermometer and a condenser was placed 61.1 g N-methylperfluorooctylsulfonamidoethyl acrylate (0.1 mol, MeFOSEA), 40 g ethyl acetate and 4.3 g (0.015 mol) 2,2-azobis-[2-methyl-N-2-hydroxyethyl)-propionamide] (a hydroxy funtionalized azo compound initiator, available from Wako as VA-086). The reaction was warmed to about 40°

C. and degassed three times. The reaction mixture was then heated at reflux for 16 hours. The resulting yellow colored reaction mixture was poured into heptane (500 mL). A slightly yellow solid precipitated and was filtered and dried in a vacuum oven at 40° C. The resulting product is a hydroxy-functional fluorochemical oligomer wherein the hydroxy group has been incorporated by way of a hydroxy-functional initiator.

Intermediate I41

Using the procedure used to make Intermediate I1, an intermediate was prepared by using 0.18 g AIBN (0.15 percent by weight based on the total weight of the monomers).

Objects and advantages of this invention are further illustrated by the following examples. The particular materials and amounts thereof recited in these examples, as well as other conditions and details, should not be construed to unduly limit this invention.

EXAMPLES

Example 1

Into a 500 mL three-necked flask fitted with a reflux condenser, a thermometer, and a stirrer, was placed 126 g (about 0.05 mol) of Intermediate I1 and 130 g ethyl acetate. 30 g of ethyl acetate were distilled out and trapped in a Dean Stark trap. The solution was cooled to 40° C. under nitrogen and 20.4 g PAPI (Upjohn polyphenylene polyisocyanate, a mixture of isocyanates represented by the general formula,

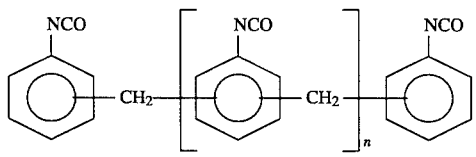

wherein n is about 0.7, 0.15 isocyanate equivalents) together with 4 drops of DBTDL (dibutyltindilaureate, Aldrich Chemical Co.) were added. The reaction mixture was heated at reflux for 5 hrs. A clear, brown solution resulted. Residual isocyanate absorption was detected in the infrared spectrum. The reaction mixture was cooled to about 50OC under nitrogen. Using an addition funnel, 8.7 g 2-butanone oxime (0.1 mol, available from Servo Co. as SERVOXIME™Y 250) was added over a period of 15 min. An exotherm occurred at the outset of the addition. The reaction mixture was then heated at 70° C. for 2 hrs. At the end of this time period, no residual isocyanate absorption was detected in the infrared spectrum. A clear brown solution was obtained, containing an oligomeric polyisocyanate linked by urethanylene groups to a fluorochemical oligomer and to an imine group. The urethanylene linking group and the imine group together are referred to herein as a blocked isocyanato. With reference to Formula I above, X=—H or —C(CH$_3$)$_2$CN
R$_1$=R$_2$=H
Q=—SO$_2$N(CH$_3$)CH$_2$CH$_2$O(O) C—
R$_f$=—C$_8$F$_{17}$
a=4
b-0
m=1
E=—CH$_2$CH$_2$—
Z=—O(O)CNH—
n=1

R=[—C$_6$H$_4$CH$_2$—[C$_6$H$_3$CH$_2$—]$_{0.7}$   C$_6$H$_4$—][—NHC(O)ON=C(CH$_3$)(CH$_2$CH$_3$)]$_{1.7}$

An emulsification procedure for preparing a dispersion containing a composition of the invention is set forth below. The composition is provided in solution from the procedure described above. Additional solvent is added to obtain an appropriate solids level (e.g. 40 to 60%) prior to emulsification. A single phase organic solution is beneficial and often required to ensure that homogeneous and stable dispersions are obtained. In cases where two physical phases (e.g., solids and liquid) exist at room temperature, heating generally results in a single phase.

Emulsification Procedure

Into a three-necked flask fitted with a stirrer, a thermometer, and a reflux condenser, was added the reaction mixture of EXAMPLE 1. The reaction mixture was diluted to 40% solids by weight with ethyl acetate and heated to 70° C. A clear, brown solution resulted. In a separate flask, a solution containing 616 g of deionized water (400% by weight based on total solids), 92 g ethylene glycol (60% by weight based on total solids) and 15.4 g of MARLOWET™5401 surfactant (10% by weight based on total solids, commercially available from Huls Co., West Germany) was premixed and heated to 70° C. The ethyl acetate solution was then added to the aqueous surfactantsolution under vigorous stirring to afford a pre-emulsion. The pre-emulsion was then emulsified at a temperature of about 70° C. by passing through a preheated Manton-Gaulin homogenizer 5 times at a pressure of 28000 kPa. The resulting emulsion was filtered through cheesecloth and the ethyl acetate was removed at 45° C. to 50° C. under reduced pressure. A slightly brown, somewhat transparent dispersion resulted, which was filtered again through cheesecloth and stored.

Examples 2–46

Using the same molar ratios, synthetic procedure, and emulsification procedure (During emulsification of Examples 13 through 46, ETHOQUAD™18/25 emulsifier (Akzo, the Netherlands) was used) as in EXAMPLE 1, further compositions of the invention were made from the reactants listed in Table V below, wherein DESMONDUR RF™ (Bayer, West Germany) is an aromatic triisocyanate containing a P=S bond; N-100 (Mobay) is an aliphatic biuret-containing triisocyanate; IPDI is isophoronediisocyanate; IPDI 1890 (Huls, West Germany) is an isocyanurate-containing triisocyanate made by trimerization of IPDI; and TDI represents 2,4-toluene diisocyanate. The composition of EXAMPLE 1 is also included in Table V.

TABLE V

| Example | Intermediate | Isocyanate | Blocking Agent/Other | Equivalent Ratio |
|---|---|---|---|---|
| 1 | I1 | PAPI | 2-butanone oxime | 1/3/2 |
| 2 | I40 | PAPI | 2-butanone oxime | 1/3/2 |
| 3 | I41 | PAPI | 2-butanone oxime | 1/3/2 |
| 4 | I1 | DESMONDUR RF | 2-butanone oxime | 1/3/2 |
| 5 | I16 | DESMONDUR RF | 2-butanone oxime | 1/3/2 |
| 6 | I2 | PAPI | 2-butanone oxime | 1/3/2 |
| 7 | I3 | PAPI | 2-butanone | 1/3/2 |

TABLE V-continued

| Example | Intermediate | Isocyanate | Blocking Agent/Other | Equivalent Ratio |
|---|---|---|---|---|
| 8 | I4 | PAPI | 2-butanone oxime | 1/3/2 |
| 9 | I5 | PAPI | 2-butanone oxime | 1/3/2 |
| 10 | I8 | PAPI | 2-butanone oxime | 1/3/2 |
| 11 | I15 | PAPI | 2-butanone oxime | 1/3/2 |
| 12 | I16 | PAPI | 2-butanone oxime | 1/3/2 |
| 13 | I25 | PAPI | 2-butanone oxime | 1/3/2 |
| 14^A | I7 | PAPI | 2-butanone oxime | 2/6/4 |
| 15 | I1 | TDI | ε-caprolactam | 1/2/1 |
| 16^B | I20 | PAPI | acetone oxime | 1/3/2 |
| 17 | I1 | PAPI | acetone oxime | 1/3/2 |
| 18 | I12 | PAPI | acetone oxime | 1/3/2 |
| 19 | I36 | PAPI | acetone oxime | 1/3/2 |
| 20 | I22 | PAPI | acetone oxime | 1/3/2 |
| 21 | I9 | PAPI | acetone oxime | 1/3/2 |
| 22 | I33 | PAPI | acetone oxime | 1/3/2 |
| 23^A | I32 | PAPI | acetone oxime | 2/6/4 |
| 24 | I1 | PAPI | phenol | 1/3/2 |
| 25 | I34 | PAPI | acetone oxime | 1/3/2 |
| 26 | I6 | PAPI | acetone oxime | 1/3/2 |
| 27 | I17 | PAPI | acetone oxime | 1/3/2 |
| 28 | I18 | PAPI | acetone oxime | 1/3/2 |
| 29 | I23 | PAPI | acetone oxime | 1/3/2 |
| 30 | I24 | PAPI | acetone oxime | 1/3/2 |
| 31^B | I20 | N-100 | ε-caprolactam | 1/3/2 |
| 32^B | I19 | IPDI | 2-butanone oxime | 1/2/1 |
| 33^B | I1 | IPDI-1890 | acetone oxime | 1/3/2 |
| 34^C | I1 | PAPI | acetone oxime/ polysiloxane monoamine | 1/3/1/1 |
| 35 | I21 | PAPI | acetone oxime | 1/3/2 |
| 36 | I27 | IPDI-1890 | acetone oxime | 1/3/2 |
| 37 | I16 | IPDI-1890 | acetone oxime | 1/3/2 |
| 38 | I27 | IPDI | acetone oxime | 1/2/1 |
| 39 | I16 | N-100 | acetone oxime | 1/3/2 |
| 40 | I37 | PAPI | acetone oxime | 1/3/2 |
| 41 | I27 | N-100 | acetone oxime | 1/3/2 |
| 42^B | I29 | IPDI | acetone oxime | 1/2/1 |
| 43^B | I39 | N-100 | acetone oxime | 1/3/2 |
| 44^B | I19 | IPDI | acetone oxime | 1/1/1 |
| 45^B | I28 | PAPI | acetone oxime | 1/3/2 |
| 46^A,D | I7 | TDI | 2-butanone oxime/VP 1610 | 4/8/2/2 |

^A I7 and I32 contain 2 equivalents of hydroxyl per mole.
^B Examples 16, 31, 43, and 45 contain a urylene linking group, and Examples 32, 42, and 44 contain an acylimino linking group.
^C The structure of the polysiloxanemonoamine is $(CH_3)_3Si[OSi(CH_3)_2]_nOSi(CH_3)_2CH_2CH_2CH_2NH_2$
having an average molecular weight of about 16,000. This compound was prepared according to the general method described in Example 10 of commonly assigned copending application 07/411,410 incorporated herein by reference.
D. VP 1610 (Wacker Chemie) is a siloxane diol of the formula:

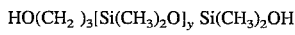
$HO(CH_2)_3[Si(CH_3)_2O]_y\,Si(CH_3)_2OH$ wherein Y is about 9.

Example 47

Into a 500 mL three-necked flask fitted with a reflux condenser, a thermometer, and a stirrer, was placed 50.4 g (0.02 mol) of Intermediate I1 and 80 g ethyl acetate. By using a Dean Stark trap 30 mL of ethyl acetate was distilled out. The solution was cooled to 50° C. under nitrogen and 5.0 g (0.02 mol) of 4,4'-methylene diphenylene diisocyanate (MDI) and 3 drops of dibutyltindilaurate were added. The resulting reaction mixture was heated at reflux (about 78° C.) for 5 hrs. Ethyl acetate was then distilled off until the reaction mixture reached a temperature of 90° C., 0.5 g triethylamine was added and the reaction was continued for 15 hrs at 90° C. At the end of this step of the reaction, some of the residual isocyanate had been converted into allophanatylene linking groups. The reaction was cooled to 50° C. under nitrogen, 1.1 g acetone oxime (0.015 mol) was added and the reaction was continued for 1 hr at 70° C. A clear, yellow solution resulted, containing a composition with fluorochemical oligomeric moieties linked to the methylene diphenylene moiety through urethanylene and allophanatylene linking groups, and containing a blocked isocyanato moiety bonded to the methylene diphenylene moiety. A dispersion was prepared according to the emulsification procedure described in Example 1.

Example 48

Into a 500 mL three-necked flask fitted with a reflux condenser, a stirrer, and a thermometer, was placed 4.7 g isocyanatoethyl methacrylate (IEM) (0.03 mol), 20 g dry ethyl acetate, and 100 ppm IRGANOX™1010 antioxidant (Ciba-Geigy). 2.6 g 2-butanoneoxime (0.03 mol) was added slowly at room temperature. An exotherm occurred and the reaction temperature rose from 20° C. to 40° C. The reaction was then continued for 3 hrs at about 30° C. A clear, yellow solution was obtained. No residual isocyanate absorption was detected in the infrared spectrum. Then 0.78 g (0.01 mol) 2-mercaptoethanol, 0.1 g AIBN, and 10 g ethyl acetate were added. After deaereating the reaction mixture, the temperature was raised to about 78° C. (gentle reflux). The reaction was continued for 16 hrs, after which time virtually no residual starting materials were detected by gas chromatography. A hydroxy-functionalized oligomer containing 3 blocked isocyanato groups per free hydroxy group was obtained.

Following the synthetic procedure outlined in Example 1, a composition of the invention was prepared by reacting isophoronediisocyanate, Intermediate I1 and the above-prepared hydroxy-functionalized oligomer containing blocked isocyanato groups. A dispersion was prepared following the emulsification procedure of Example 1, using ETHOQUAD™ emulsifier 18/25 as an emulsifier.

Example 49

Using the general procedure used to make Intermediate I1, an end-capped macromerit alcohol intermediate was prepared by reacting isobutyl methacrylate and 2-mercaptoethanol in a molar ratio of 70 to 1 in ethyl acetate using AIBN as initiator. The macromeric alcohol was obtained as a white powder.

Following the procedure described in Example 1, a composition of the invention was prepared by reacting PAPI, Intermediate I1, acetone oxime and the macromeric alcohol prepared in step A above in an equivalent ratio of 3/1/1/1. A clear, brown solution was obtained. A dispersion was prepared using the emulsification procedure of Example 1 using ETHOQUAD™18/25 emulsifier as emulsifier.

With reference to Formula I above, the structures of several of the above examples are described below:

Example 12

X=H or —C(CH₃)₂CN
R₁=R₂=H
Q=—SO₂N(CH₃)CH₂CH₂O(O) C—
R_f=—C₈F₁₇
a=3.2
b=0.8
R₃=2xH, CH₃ and —C(O)OCH₂CH(CH₃)₂
m=1
E=—CH₂CH₂—
Z=—NHC(O)O—
n–1

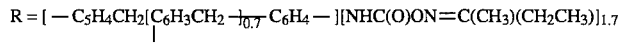

Example 16
X=H or —C(CH₃)₂CN
R₁=R₂=H
Q=—SO₂N(CH₃)CH₂CH₂O(O)C—
R_f=—C₈F₁₇
a=3.2
b=0.8
R₃=2xH,CH₃,—C(O)OCH₂CH(CH₃)₂
m=1
E=—CH₂CH₂—
Z=—NHC(O)NH—
n=1

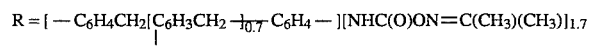

Example 25
X=H or —C(CH₃)₂CN
R₁=R₂=H
Q=—SO₂N(CH₃) CH₂CH₂O(O) C—
R_f=—C₈F₁₇
a=3.2
b=0.8
R₃=2xH, CH₃ and —CO₂H
m=1
E=—CH₂CH₂—
Z=—NHCO₂—
n=1
R=as in Example 12 above Example 33
X=H or —C(CH₃)₂CN
R₁=R₂=H
Q—SO₂N(CH₃)CH₂CH₂O(O)C—
R_f=—C₈F₁₇
a=4
b=0
m=1
E=—CH₂CH₂—
Z=—NHCO₂—
n=1
R=isocyanurate moiety from IPDI 1890 described above bound by each of two valences to —NHC(O)ON=C(CH₃)₂

Example 39
X=H or —C(CH₃)₂CN
R₁=R₂=H
Q=—SO₂N(CH₃)CH₂CH₂O(O)CR—
R_f=—C₈F₁₇
a=3.2
b=0.8
R₃=2xH, CH₃ and —C(O)OCH₂CH(CH₃)₂
m=1
E=—CH₂CH₂—
Z=—NHCO₂—
n=1

R=—(CH₂)₆N[C(O)NH(CH₂)₆NHC(O)ON=C(CH₃)₂]₂

The compositions prepared in the examples above were used to treat various substrates. The compositions of Examples 1–14 and 46 were used to treat a 100% cotton fabric substrate. The treatment bath contained (1) the appropriate aqueous dispersion prepared as described in Example 1 above; (2) a resin formulation consisting of LYOFIX CHN™ resin (Chemische Fabrik Pfersee, 12 g per liter based on the total volume of the treatment bath), KNITTEX ZO™ resin (Pfersee, 6 g per liter based on the total volume of the treatment bath), and 60 percent acetic acid (2 mL per liter based on the total volume of the treatment bath); and (3) water, q.s., such that the treatments were made by a padding application at 0.3% solids on fabric. After treatment, the substrates were dried and cured at 150° C. for 10 min. The results shown in Table VI below, wherein "OR" designates oil repellency, "WR" designates water repellency, and "SR" designates spray resistance, were obtained according to the test methods described above.

TABLE VI

|  | Initial | | 5x Laundered (40° C.) | | 1 Dryclean | |
| --- | --- | --- | --- | --- | --- | --- |
| Example | OR | SR | OR | SR | OR | SR |
| 1 | 6 | 100 | 4 | 90 | 5 | 100 |
| 2 | 4 | 100 | 3 | 80 | 3 | 90 |
| 3 | 6 | 100 | 5 | 100 | 5 | 100 |
| 4 | 5 | 100 | 3 | 90 | 4 | 90 |
| 5 | 5 | 100 | 4 | 90 | 4 | 100 |
| 6 | 5 | 100 | 3 | 80 | 4 | 100 |
| 7 | 5 | 100 | 4 | 80 | 5 | 90 |
| 8 | 4 | 100 | 2 | 70 | 3 | 90 |
| 9 | 3 | 100 | 2 | 70 | 2 | 80 |
| 10 | 4 | 100 | 2 | 80 | 3 | 90 |
| 11 | 6 | 100 | 5 | 90 | 5 | 100 |
| 12 | 5 | 100 | 4 | 80 | 4 | 100 |
| 13 | 3 | 100 | 1 | 90 | 1 | 80 |
| 14 | 4 | 100 | 2 | 80 | 3 | 90 |
| 15 | 3 | 100 | 2 | 75 | 3 | 80 |
| Comparative Example 1 (AG-310ᴬ) | 2 | 100 | 1 | 70 | 2 | 70 |
| Comparative Example 2 (OLEO- | 4 | 100 | 2 | 90 | 2 | 100 |

TABLE VI-continued

| | Initial | | 5x Laundered (40° C.) | | 1 Dryclean | |
|---|---|---|---|---|---|---|
| Example | OR | SR | OR | SR | OR | SR |
| PHOBOL PF[B]) Comparative Example 3[c] | 2 | 100 | 0 | 80 | 0 | 80 |

[A]AG-310 is a fluorochemical product available from Asahi Glass Co., Japan.
[B]OLEOPHOBOL ™ PF is a fluorochemical product available from Chemische Fabrik Pfersee, West Germany.
[c]PAPI/MeFOSE/2-butanone oxime (equivalents 3/1/2), prepared according to the general procedure of Example 1.

Table VI shows that these compositions of the invention provide good oil and water repellency, even after laundering and drycleaning, to fabrics treated therewith. Generally the results are comparable to, and in some instances better than, those obtained with Comparative Examples 1 and 2, which represent commonly used commercial products. All compositions used in TABLE VI comprise blocked isocyanato groups, and all are quite durable. Results are obtained on cotton, a fabric known to be difficult to treat effectively.

The comparison of the results obtained with the compositions of the invention to those obtained with Comparative Example 3, which contains an isolated fluoroaliphatic group and not several fluoroaliphatic groups proximal to one another, shows that the presence of several fluoroaliphatic groups proximal to one another generally affords superior results.

The compositions of Examples 1, 6, 7, 8, and 9 have oligomeric chains containing about 4, 2, 8, 16, and 40 polymerized fluorochemical monomers, respectively (based on the molar ratio of the monomer to the chain transfer agent used in their preparation). The results indicate that a chain length of between about 2 and about 8 affords optimal performance.

The composition of Example 4 was prepared using a fluorochemical oligomer containing fluorochemical monomer units only, while the composition of Example 5 was prepared using a fluorochemical oligomer containing a 4:1 ratio of fluorochemical to non-fluorinated monomer units (i.e., a "mixed" oligomer). Results show a slight improvement in performance in the instance where the mixed oligomer, and therefore less fluorochemical monomer, is used. This indicates an improvement in fluorine efficiency when the mixed oligomer is used.

The composition of Example 14 incorporates a di-functional fluorochemical oligomeric portion and hence has more than one urethanylene linking group between oligomeric portion and organic moiety. The results remain comparable to those obtained with the compositions of the commercially used Comparative Examples 1 and 2, but are not as good as those obtained with the compositions of Examples 1–8, which largely comprise compounds containing only one urethanylene linking group between the fluorochemical oligomeric portion and the organic moiety.

The composition of Example 46, comprising a siloxanyl moiety, provided a particularly soft hand to the fabric.

The Comparative Examples in Table VII below were prepared as follows:

Comparative Example 4

Comparative Example 4 is the urethane made as set forth below by reaction of PAPI with the citrate triester alcohol of N-methylperfluorooctane-sulfonamidobutanol (MeFOSB) and acetone oxime in an equivalents ratio of 3/1/2.

Into a 500 mL three-necked flask fitted with a stirrer, a reflux condenser, a Dean Stark trap, and a thermometer, was placed 175.5 g (0.3 mol) MeFOSB, 21.0 g citric acid monohydrate (0.1 mol), 50 g methyl isobutyl ketone and 0.39 g para-toluene sulfonic acid. The reaction mixture was heated to reflux (about 126° C.) and an azeotropic distillate was collected in the Dean Stark trap. The reaction was stopped when no more water was collected as bottom phase in the azeotrope. After 4 hrs of reaction, 5.3 g water was trapped. The catalyst was quenched with a 10% aqueous $NaHCO_3$ Solution and water was again azeotropically removed from the reaction mixture. The reaction mixture was cooled to about 40° C. under nitrogen, 100 g ethyl acetate was added together with 40.8 g PAPI (0.3. isocyanate equivalents) and 4 drops of dibutyltindilaureate catalyst. The resulting mixture was heated at reflux for 6 hrs (about 80° C.). The reaction mixture was cooled to about 50° C. and 14.6 g (0.2 mol) of acetone oxime was added slowly over a 30 min period, resulting in an immediate exotherm. The reaction was continued at 70° C. for 2 hrs. No residual isocyanate absorption was detected in the infrared spectrum. A clear, brown solution was obtained. A dispersion was prepared according to the emulsification procedure described in Example 1.

The composition made in this procedure contains a fluorochemical alcohol containing 3 fluorochemical tails on adjacent carbon atoms.

Comparative Example 5

A compound was prepared using the procedure described in Japanese Patent No. 55-7820 (Hayashi et al.), Example 2, using MeFOSEA as fluorochemical monomer, 2-mercaptoethanol as end-capping agent (molar ratio 4 to 1), ethyl acatate as solvent and AIBN as initiator. A dispersion was prepared as described in Example 1, but without the ethylene glycol in the aqueous solution.

Comparative Example 6

A compound was prepared following the procedure described in U.S. Pat. No. 4,302,366 (Perronin et al.), Example 2, using the MeFOSEA as fluoromonomer. A dispersion was prepared using the emulsification method described in Example 1.

The compositions of Examples 1, 15–45, and 47–49 and Comparative Examples 4–6 were used to treat polyester/cotton 65/35 blend fabric. No resins were used. Treatment level was 0.3% solids on fabric; the substrates were dried and cured for 10 min at 150° C. The results are shown in Table VII below.

TABLE VII

| Example | Initial | | | | 5x Launder | | | Dryclean | | |
|---|---|---|---|---|---|---|---|---|---|---|
| | OR | WR | Abrasion OR | SR | OR | WR | SR | OR | WR | SR |
| 1 | 6 | 7 | 5 | 100 | 4 | 4 | 100 | 5 | 5 | 80 |
| 15 | 6 | 7 | 5 | 80 | 4 | 5 | 70 | 5 | 4 | 70 |
| 16 | 5 | 5 | 3 | 80 | 2 | 4 | 70 | 4 | 2 | 70 |
| 17 | 5 | 8 | 5 | 100 | 4 | 6 | 90 | 5 | 5 | 80 |
| 18 | 5 | 7 | 5 | 100 | 4 | 6 | 100 | 5 | 4 | 80 |
| 19 | 6 | 9 | 5 | 100 | 5 | 5 | 100 | 5 | 4 | 80 |
| 20 | 5 | 4 | 4 | 70 | 2 | 0 | 50 | 4 | 1 | 70 |
| 21 | 6 | 8 | 4 | 100 | 4 | 4 | 80 | 4 | 4 | 70 |
| 22 | 4 | 6 | 3 | 90 | 2 | 4 | 80 | 2 | 4 | 70 |
| 23 | 4 | 6 | 3 | 100 | 3 | 4 | 80 | 3 | 4 | 80 |
| 24 | 6 | 7 | 4 | 100 | 4 | 6 | 70 | 5 | 4 | 80 |
| 25 | 4 | 5 | 3 | 90 | 2 | 4 | 90 | 2 | 2 | 50 |
| 26 | 5 | 7 | 4 | 100 | 3 | 4 | 70 | 5 | 7 | 80 |
| 27 | 3 | 5 | 3 | 100 | 2 | 4 | 70 | 4 | 4 | 70 |
| 28 | 4 | 5 | 3 | 90 | 2 | 4 | 50 | 3 | 4 | 70 |
| 29 | 5 | 7 | 4 | 100 | 3 | 5 | 80 | 4 | 4 | 70 |
| 30 | 4 | 5 | 2 | 100 | 2 | 4 | 80 | 1 | 2 | 70 |
| 31 | 4 | 6 | 3 | 100 | 3 | 4 | 80 | 3 | 4 | 70 |
| 32 | 4 | 5 | 3 | 90 | 1 | 2 | 70 | 5 | 4 | 70 |
| 33 | 6 | 5 | 4 | 100 | 4 | 4 | 90 | 4 | 4 | 70 |
| 34 | 3 | 5 | 2 | 100 | 2 | 4 | 100 | 3 | 4 | 70 |
| 35 | 6 | 6 | 5 | 100 | 5 | 5 | 100 | 3 | 3 | 70 |
| 36 | 2 | 4 | 2 | 100 | 2 | 3 | 70 | 3 | 4 | 70 |
| 37 | 5 | 5 | 3 | 90 | 1 | 2 | 70 | 5 | 4 | 70 |
| 38 | 4 | 5 | 1 | 100 | 3 | 4 | 80 | 3 | 3 | 70 |
| 39 | 5 | 6 | 3 | 90 | 2 | 4 | 70 | 5 | 4 | 70 |
| 40 | 4 | 4 | 3 | 100 | 3 | 4 | 80 | 4 | 4 | 80 |
| 41 | 4 | 4 | 2 | 80 | 2 | 4 | 70 | 4 | 4 | 70 |
| 42 | 2 | 4 | 1 | 80 | 1 | 2 | 50 | 2 | 2 | 50 |
| 43 | 5 | 8 | 3 | 90 | 2 | 3 | 50 | 4 | 7 | 70 |
| 44 | 5 | 5 | 3 | 100 | 2 | 3 | 70 | 4 | 4 | 70 |
| 45 | 3 | 4 | 2 | 100 | 2 | 2 | 70 | 4 | 4 | 70 |
| 47 | 6 | 6 | 5 | 100 | 5 | 4 | 90 | 5 | 4 | 70 |
| 48 | 3 | 4 | 2 | 90 | 2 | 4 | 70 | 3 | 4 | 70 |
| 49 | 5 | 4 | 4 | 90 | 4 | 4 | 70 | 3 | 3 | 70 |
| Comparative Example 4 | 5 | 2 | 3 | 70 | 4 | 2 | 70 | 3 | 3 | 50 |
| Comparative Example 5 | 6 | 2 | 4 | 50 | 2 | 0 | 0 | 4 | 2 | 50 |
| Comparative Example 6 | 5 | 2 | 2 | 50 | 0 | 0 | 0 | 3 | 2 | 50 |

The results in Table VII show that the compositions of the invention provide improved water repellency to fabrics treated therewith, even after laundering and drycleaning, when compared to the compositions of Comparative Examples 4 and 5.

The compositions of the invention show better overall performance than the composition of Comparative Example 4, which contains 3 fluoroaliphatic groups on adjacent carbon atoms. This indicates that the fluoroaliphatic groups in the compositions of the invention, which are proximal to one another but not uniformly on adjacent carbon atoms, are more effective than those on adjacent carbon atoms. The compositions of the invention comprise blocked isocyanato groups, and are generally more durable when applied to the substrate than are the Comparative Examples.

The composition of Example 18 incorporates $C_6$ fluoroaliphatic groups, while the other compositions of the invention incorporate $C_8$ fluoroaliphatic groups. Performance remains good, however, and fluorine efficiency can be said to be improved relative to, e.g. Example 1.

The compositions of Examples 19 and 40 comprise hydrophilic polyoxyethylenyl units. The water repellent properties of the substrates treated therewith, however, remains high.

The compositions of Examples 16, 31, 32, 33, 36, 37, 39, and 41–45 comprise isocyanate-derived linking groups other than urethanylene groups. Such compositions, as well as the urethanylene-containing compositions, provide good properties compared to the Comparative Examples.

The results of TABLE VII also indicate that compositions arising from the use of an aromatic isocyanate (e.g., Examples 1 and 17) impart better repellency and durability than those arising from non-aromatic isocyanates (e.g., Examples 31, 33, 36–39, and 41–44). Compositions arising from non-aromatic isocyanates, however, are generally better than the Comparative Examples.

Some of the compositions of the invention (Examples 34, 36, 41, 42, and 45) comprise siloxanyl groups and provide not only good repellency, but also a very soft and pleasant "hand", which is a very desirable property for some applications such as rainwear.

Example 50

Into a 500 mL three-necked flask fitted with a reflux condenser, a stirrer, and a thermometer, was placed 50.4 g Intermediate I1 (0.02 mol) and 80 g ethyl acetate. By using a Dean Stark trap 20 mL of ethyl acetate was distilled out. The solution was cooled to about 50° C. under nitrogen and 8.2 g PAPI (0.06 eq) and 3 drops of dibutyltindilaureate were added. The reaction mixture was heated to reflux (about 78° C.) for 5 hrs. Then 22.8 g (0.04 eq) of N-ethylperfluorooctylsulfonamidoethanol (EtFOSE) were added and the reaction was continued at reflux for 15 hrs. A clear brown solution was obtained containing an oligomeric isocyanate linked through urethanylene groups to a fluorochemical oligomer and to a single-tail fluorochemical moiety.

This composition contains a compound of Formula I as follows:

X=H or —C(CH$_3$)$_2$CN
R$_1$=R$_2$=H
Q=—SO$_2$N(CH$_3$)CH$_2$CH$_2$O(O)C—
R$_f$=—C$_8$F$_{17}$
a=4
b=0
m=1
E=—CH$_2$CH$_2$—
Z=—NHCO$_2$—
n=1
R=[—C$_6$H$_4$CH$_2$–[C$_6$H$_3$CH$_2$]$_{0.7}$    C$_6$H$_4$—][—NHC(O)OCH$_2$CH$_2$N(CH$_2$CH$_3$)SO$_2$C$_8$F$_{17}$]$_{1.7}$

Dispersions were prepared using the emulsification procedure described in Example 1.

TABLE VIII

| Example | Intermediate | Isocyanate | Other Reagents | Ratio of Equivalents A/B/C |
|---|---|---|---|---|
| 50 | I1 | PAPI | EtFOSE | 1/3/2 |
| 51 | I1 | PAPI | 2-ethylhexanol | 1/3/2 |
| 52 | I1 | N-100 | 2-ethylhexanol | 1/3/2 |
| 53 | I1 | TDI | dihexylamine | 1/2/1 |
| 54 | I1 | TDI | triethanolamine | 3/6/1 |
| 55^ | I13 | IPDI | 2-ethylhexanol | 1/2/1 |
| 56 | I1 | IPDI | palmitic acid | 1/2/1 |
| 57 | I1 | TDI | FOSEE | 2/4/1 |
| 58 | I11 | PAPI | hexadecanol | 1/3/2 |
| 59 | I30 | PAPI | 2-ethylhexanol | 1/3/2 |
| 60 | I1 | TDI | siloxane diamine | 2/4/1 |
| 61 | I1 | TDI | siloxane diol | 2/4/1 |
| 62 | I1 | IPDI | siloxane diol | 2/4/1 |
| 63 | I10 | PAPI | hexadecanol | 1/3/2 |

^The composition of Example 55 contains an acylimino linking group.

Examples 50–63 were used to treat polyester/cotton 65/35 blend fabrics as described above in connection with Examples 1, 15–45, and 47–49. No resins were used. Results are shown in Table IX below.

TABLE IX

| | Initial | | | | 5x Launder | | | Dryclean | | |
|---|---|---|---|---|---|---|---|---|---|---|
| Example | OR | WR | Abrasion OR | SR | OR | WR | SR | OR | WR | SR |
| 50 | 5 | 8 | 5 | 80 | 4 | 4 | 80 | 5 | 5 | 70 |
| 51 | 5 | 6 | 4 | 100 | 2 | 1 | 50 | 5 | 5 | 70 |
| 52 | 6 | 8 | 3 | 80 | 4 | 4 | 70 | 6 | 8 | 80 |
| 53 | 6 | 6 | 4 | 90 | 4 | 6 | 50 | 5 | 4 | 50 |
| 54 | 6 | 8 | 5 | 100 | 3 | 4 | 70 | 5 | 7 | 70 |
| 55 | 6 | 8 | 5 | 80 | 2 | 1 | 70 | 4 | 4 | 70 |
| 56 | 6 | 7 | 4 | 70 | 3 | 0 | 50 | 4 | 6 | 70 |
| 57 | 6 | 8 | 4 | 100 | 4 | 3 | 70 | 5 | 7 | 80 |
| 58 | 4 | 5 | 1 | 100 | 2 | 3 | 80 | 2 | 4 | 70 |
| 59 | 5 | 6 | 3 | 90 | 4 | 5 | 70 | 5 | 4 | 70 |
| 60 | 6 | 7 | 3 | 100 | 4 | 4 | 70 | 5 | 6 | 70 |
| 61 | 4 | 4 | 2 | 90 | 2 | 2 | 50 | 2 | 2 | 70 |
| 62 | 6 | 6 | 5 | 100 | 5 | 5 | 100 | 3 | 3 | 70 |
| 63 | 6 | 6 | 3 | 100 | 2 | 2 | 50 | 5 | 6 | 70 |
| Comparative Example 5 | 6 | 2 | 4 | 50 | 2 | 0 | 0 | 4 | 2 | 50 |
| Comparative Example 6 | 5 | 2 | 2 | 50 | 0 | 0 | 0 | 3 | 2 | 50 |

Further compositions of the invention were made as shown in Table VIII below, wherein EtFOSE is as described above, FOSEE represents N,N(2-hydroxyethyl)perfluorooctanesulfonamide, siloxane diamine represents a compound of the formula:

H$_2$N(CH$_2$)$_3$Si(CH$_3$)$_2$[OSi(CH$_3$)$_2$]$_n$OSi(CH$_3$)$_2$(CH$_2$)$_3$NH$_2$ with an average molecular weight of about 3900, described in U.S. Pat No. 4,293,397 (Sato et al.) incorporated herein by reference; and siloxane diol represents fluid Q43667 having a chemical formula

HOCH$_2$CH$_2$CH$_2$Si(CH$_3$)$_2$O[Si(CH$_3$)$_2$O]$_n$Si(CH$_3$)$_2$CH$_2$CH$_2$CH$_2$OH with a hydroxyl equivalent weight of 1200 and an average molecular weight of about 2400 (commercially available from Dow Corning).

The results in Table IX show that the compositions of the invention give excellent oil and water repellency, particularly when measured initially. Their laundering and drycleaning durability is somewhat less than that of the compositions described above in Examples 1–49. We feel that this is related to the absence of blocked isocyanato groups. Some of the compositions in TABLE IX show very good oil repellency after the abrasion test, a characteristic which is very desirable in, for example, upholstery applications. The compositions of Examples 58 and 63, made from oligomeric intermediates that were prepared using vinyl ethers and allylamides as fluorochemical monomers show repellent properties comparable to those compositions made from intermediates that were prepared from acrylate monomers. The compositions of Examples 60–62, containing siloxanyl moieties, exhibit a very soft hand.

Example 64

Into a 500 mL three-necked flask fitted with a stirrer, a reflux condenser, and a thermometer, was placed 125 g (0.05 mol) of Intermediate I1 and 100 g ethyl acetate. By using a Dean Stark trap, 20 g ethyl acetate was distilled out. The reaction mixture was cooled to 50° C. under nitrogen. 18.7 g MDI (4,4'-methylene diphenylene diisocyanate, 0.075 mol, Bayer), was added together with 3 drops of dibutyltindilaureate. The reaction was heated at 70° C. for 6 hrs. A clear yellow solution resulted. The infrared spectrum showed the presence of unreacted isocyanate groups. 7.5 g of a 20% solution in dichloromethane of 3-methyl-1-phenyl-1-3-phospholene-1-oxide was added to convert all residual isocyanate into carbodiimide. The reaction was heated to reflux (about 80° C.). Slow gas evolution was observed. The reaction was continued for 15 hrs at reflux. At the end of this period, a slightly hazy yellow solution was formed. All residual isocyanate was converted into carbodiimide groups, as indicated by the complete disappearance of the isocyanate absorption in the infrared spectrum and the appearance of the carbodiimide absorption.

A dispersion was prepared according to the emulsification procedure described in Example 1. This composition contains a compound of Formula I as follows:
X=H or $-C(CH_3)_2CN$
$R_1=R_2=H$
$Q=-SO_2N(CH_3)CH_2CH_2O(O)C-$
$R_f=-C_8F_{17}$
a=4
b=0
m=1
$E=-CH_2CH_2-$
$Z=-NHCO_2-$
n=2
$R=-C_6H_4CH_2(-C_6H_4N=C=NC_6H_4CH_2)_e-C_6H_4-$
wherein e is an integer from 1 to about 3.

Example 65

In this example, a guanidine was prepared.

Into a three-necked 500 mL flask fitted with a reflux condenser, a thermometer, and a stirrer, was added a carbodiimide containing solution according to the procedure of Example 64 using 50.4 g (0.02 mol) Intermediate I1, 7.5 g MDI (0.03 mol), and 60 g of ethyl acetate.

The carbodiimide-containing reaction mixture was cooled to 60° C. under nitrogen, and 2.6 g (0.02 mol) of dibutylamine was added.

The reaction mixture was reacted at 70° C. for 2 hrs. The infrared spectrum showed the complete disappearance of the carbodiimide absorption.

A dispersion was prepared according to the emulsification procedure outlined in Example 1. This composition contains a compound of Formula I as follows:
X=H or $-C(CH_3)_2CN$
$R_1=R_2=H$
$Q=-SO_2N(CH_3)-CH_2CH_2O(O)C-$
$R_f=-C_8F_{17}$
a=4
b=0
m=1
$E=-CH_2CH_2-$
$Z=-NHCO_2-$
n=2
q=0

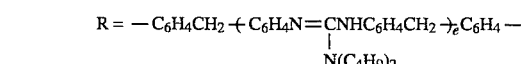

wherein e is an integer from 1 to about 3.

Examples 66–69

Following the synthetic procedure and the emulsification procedure of Example 1, compositions were prepared using the components set forth in Table X below.

TABLE X

| Example | Intermediate (A) | Isocyanate (B) | Equivalents Ratio (A/B) |
|---|---|---|---|
| 66 | I1 | IPDI | 2/1 |
| 67 | I1 | HMDI | 2/1 |
| 68 | I7 | ODI | 2/2 |
| 69 | I38 | PAPI | 3/3 |

The compositions of Examples 64–69 were applied to a polyester/cotton 65/35 blend fabric using the method described above in connection with Examples 1, 15–45, and 47–49. No resins were used. Treatment level was 0.3% solids on fabric. Results are shown in Table XI below.

TABLE XI

| | Initial | | | | 5x Launder | | | Dryclean | | |
|---|---|---|---|---|---|---|---|---|---|---|
| Example | OR | WR | Abrasion OR | SR | OR | WR | SR | OR | WR | SR |
| 64 | 5 | — | — | 100 | 3 | — | 80 | 4 | — | 80 |
| 65 | 5 | 7 | 4 | 80 | 3 | 4 | 50 | 5 | 6 | 70 |
| 66 | 6 | 8 | 5 | 80 | 2 | 1 | 50 | 5 | 8 | 70 |
| 67 | 6 | 8 | 5 | 90 | 4 | 3 | 50 | 5 | 6 | 90 |
| 68 | 5 | 7 | 4 | 80 | 2 | 1 | 50 | 4 | 4 | 70 |
| 69 | 5 | 6 | 4 | 80 | 3 | 4 | 70 | 4 | 5 | 70 |
| Comparative Example 5 | 6 | 2 | 4 | 50 | 2 | 0 | 0 | 4 | 2 | 50 |
| Comparative | 5 | 2 | 2 | 50 | 0 | 0 | 0 | 3 | 2 | 50 |

TABLE XI-continued

| Example | Initial | | | | 5x Launder | | | Dryclean | | |
|---|---|---|---|---|---|---|---|---|---|---|
| | OR | WR | Abrasion OR | SR | OR | WR | SR | OR | WR | SR |
| Example 6 | | | | | | | | | | |

The results in Table XI show that these compositions of the invention exhibit particularly good repellent properties and abrasion resistance.

Examples 70–73

Following the synthetic procedure and the emulsification procedure of Example 1, compositions of the invention were prepared using the components set forth in Table XII below.

TABLE XII

| Example | Interme- diate (A) | Isocyanate (B) | Other Reagent (C) | Equivalents Ratio A/B/C |
|---|---|---|---|---|
| 70 | I1 | PAPI | 1,3-dichloro-2-propanol | 1/3/2 |
| 71 | I1 | PAPI | 2-aziridinyl-ethanol | 1/3/2 |
| 72 | I30 | PAPI | 2-ethylhexanol | 1/3/2 |
| 73 | I1 | PAPI | glycidol | 1/3/2 |

The compositions of Examples 70–73 were applied to a polyester/cotton 65/35 blend fabric using 0.3% solids on fabric as set forth above in connection with Examples 1, 15–45, and 47–49. No resins were used. Results are set forth in Table XIII below.

TABLE XIII

| Example | Initial | | | | 5x Launder | | | Dryclean | | |
|---|---|---|---|---|---|---|---|---|---|---|
| | OR | WR | Abrasion OR | SR | OR | WR | SR | OR | WR | SR |
| 70 | 6 | 7 | 4 | 90 | 4 | 4 | 70 | 5 | 4 | 70 |
| 71 | 6 | 7 | 4 | 100 | 4 | 5 | 70 | 5 | 5 | 70 |
| 72 | 5 | 6 | 3 | 90 | 4 | 5 | 70 | 5 | 4 | 70 |
| 73 | 5 | 6 | 5 | 90 | 5 | 6 | 80 | 5 | 4 | 80 |

The results in TABLE XIII show that these compositions of the invention exhibit good durability, presumably due to the presence of the functional groups of the other reagent (i.e., C in TABLE XII) used in their preparation.

Examples 74–88

Into a 500 mL three-necked flask fitted with a thermometer, a stirrer, and a reflux condenser, was placed 50.4 g (0.02 mol) of Intermediate I1 and 80 g methyl ethyl ketone (MEK). By Dean Stark distillation, 20 mL of MEK was distilled out. The reaction mixture was cooled to about 45° C. and 8.2 g (0.06 isocyanate equivalents) of PAPI and 3 drops of dibutyltindilaureate were added. The reaction was heated at reflux (about 78° C.) for 5 hrs. Then, 12 g (0.04 hydroxy equivalents) of 12-hydroxystearic acid was added. The reaction was continued at reflux for 15 hrs. A clear, brown solution was obtained containing a fluorochemical oligomeric portion bonded through a urethanylene group to the hydrocarbon nucleus of PAPI, which is further bonded through urethanylene groups to a carboxylic acid-containing moiety. After reaction, no residual isocyanate was detected.

Emulsification Procedure

Into a 1 liter, three-necked flask fitted with a stirrer, a thermometer, and a reflux condenser, was placed the fluorochemical solution from Example 74, diluted to 40 percent solids with an additional 115 g of MEK. The solution was heated to 70° C. In a separate 1 L beaker an aqueous solution of 1.4 g of TRITON™X-305 emulsifier, 42 g ethylene glycol and 420 g deionized water was prepared and heated to 70° C. The heated aqueous solution was added to the fluorochemical solution with vigorous agitation to form a pre-emulsion. 5.6 g (0.04 mol) of a 25% aqueous ammonium hydroxide solution was added to neutralize the carboxylic acid. The neutralized pre-emulsion was passed through a preheated Manton-Gaulin homogenizer 5 times at about 28000 kPa. The resulting emulsion was slightly brown and almost transparent. Methyl ethyl ketone was distilled out under reduced pressure at about 50° C. and the resulting dispersion was filtered through cheesecloth.

Referring to Formula I, $X = H$ or $-C(CH_3)_2N$
$R_1 = R_2 = H$
$Q = -SO_2N(CH_3)CH_2CH_2O(O)C-$
$R_f = -C_8F_{17}$
$a-4$
$b=0$
$m=1$
$E = -CH_2CH_2-$
$Z = -NHCO_2-$
$n=1$ $R = [-C_6H_4CH_2[C_6H_3CH_2]_{0.7}C_6H_4-][HNC(O)OCH(CH_2)_{10}CO_2H]_{1.7}$
                                                           |
                                                        $(CH_2)_5CH_3$ In a similar manner, further acid- and/or acid salt-containing compositions and dispersions thereof were prepared from the components set forth in Table XlV below, wherein HEPES represents 4-(2-hydroxyethyl)-1-piperazine ethanesulfonic acid.

TABLE XIV

| Example | Other Reagent | Isocyanate | Intermediate | Acid-Containing Component | Base to Neutralize the Acid Group |
|---|---|---|---|---|---|
| 75[A] | acetone oxime | PAPI | I34 | — | — |
| 76[A] | — | PAPI | I1 | lactic acid | — |
| 77 | — | TDI | I1 | 6-aminocaproic acid | $NH_4OH$ |
| 78 | — | PAPI | I1 | 12-hydroxystearic acid | triethanolamine |
| 79 | — | PAPI | I35 | — | NaOH |
| 80 | — | PAPI | I16 | 12-hydroxystearic acid | $NH_4OH$ |
| 81 | — | TDI | I1 | malic acid | $NH_4OH$ |
| 82 | — | TDI | I1 | dimethyolpropionic acid | $NH_4OH$ |
| 83[B] | — | PAPI | I1 | HEPES | $NH_4OH$ |
| 84 | — | TDI | I1 | $H_2NCH_2CH_2SO_3H$ | triethylamine |
| 85[C] | — | PAPI | I1 | 12-hydroxystearic acid | KOH |
| 86 | — | PAPI | I1 | 12-hydroxystearic acid | triethylamine |
| 87 | — | PAPI | I1 | 12-hydroxystearic acid | NaOH |
| 88 | — | PAPI | I1 | 12-hydroxystearic acid | LiOH |

[A]In EXAMLES 75 and 76, the carboxylic acid was not neutralized. In EXAMPLE 75 the equivalents ratio PAPI/I34/acetone oxime was 3/1/2
[B]In EXAMPLE 83, 83 g DMF was used as solvent
[C]In EXAMPLES 85, 86, 87, and 88, isopropanol was added to improve emulsion stability, respectively 50 g, 80 g, 50 g, and 87 g Compositions were applied to a polyester/cotton 65/35 blend fabric at 1% solids on fabric and tested according to the test procedures set forth above. Results are shown below in Table XV.

TABLE XV

| | Initial | | | | 5x Launder | | | Dryclean | | |
|---|---|---|---|---|---|---|---|---|---|---|
| Example | OR | WR | Abrasion OR | SR | OR | WR | SR | OR | WR | SR |
| 74 | 4 | 3 | 2 | 70 | 2 | 1 | 50 | 4 | 2 | 50 |
| 75 | 4 | 5 | 3 | 90 | 2 | 4 | 90 | 2 | 2 | 50 |
| 76 | 6 | 4 | 5 | 70 | 2 | 2 | 50 | 4 | 3 | 50 |
| 77 | 5 | 4 | 5 | 70 | 2 | 0 | 0 | 3 | 3 | 50 |
| 78 | 5 | 4 | 5 | 70 | 2 | 2 | 50 | 4 | 3 | 50 |
| 79 | 4 | 2 | 2 | 50 | 1 | 0 | 0 | 4 | 1 | 50 |
| 80 | 4 | 3 | 2 | 70 | 2 | 1 | 50 | 4 | 2 | 50 |
| 81 | 5 | 4 | 3 | 70 | 2 | 0 | 0 | 5 | 4 | 70 |
| 82 | 5 | 4 | 1 | 70 | 2 | 1 | 50 | 3 | 0 | 50 |
| 83 | 5 | 4 | 2 | 70 | 2 | 0 | 0 | 3 | 0 | 50 |
| 84 | 5 | 4 | 2 | 70 | 2 | 0 | 0 | 4 | 0 | 50 |
| 85 | 5 | 4 | 2 | 70 | 2 | 0 | 0 | 4 | 0 | 50 |
| 86 | 6 | 6 | 2 | 70 | 4 | 2 | 50 | 5 | 4 | 50 |
| 87 | 6 | 4 | 4 | 70 | 4 | 2 | 70 | 5 | 4 | 50 |
| 88 | 6 | 4 | 2 | 70 | 4 | 2 | 50 | 3 | 2 | 50 |
| Comparative Example 6 | 5 | 2 | 2 | 50 | 0 | 0 | 0 | 3 | 2 | 50 |

The results in Table XV show that these compositions of the invention (containing an acid salt moiety) exhibit high oil repellency compared to the Comparative Example.

Examples 89–90

Compositions of the invention comprising polyoxyethylene groups were prepared using the synthetic procedure and the emulsification procedure of Example 1 using the components set forth in Table XVI below. (Cw750, 3350 and 5000 are methoxypolyethyleneoxide glycols of average molecular weight 750, 3350 and 5000 available from Union Carbide. JEFFAMINE™ ED 2001 surfactant is a polyoxyethylene-containing monoamine available from Texaco). MARLOWET™ 5401 emulsifier was used as emulsifier.

TABLE XVI

| Example | Intermediate (A) | Isocyanate (B) | Coreagent (C) | Ratio of Equivalents $A/B/C_1/C_2$ |
|---|---|---|---|---|
| 89 | I26 | PAPI | acetone oxime | 1/3/2/— |
| 90 | I1 | PAPI | CW5000/ ammonium 12-hydroxystearate | 1/3/1/1 |

A 65/35 polyester/cotton blend fabric was treated with the compositions above at a level of 0.45% solids on fabric. No resins were used. The treated fabric was dried for 10 minutes at 70° C. and cured for 5 minutes at 150° C. The fabrics were tested using test procedures as set forth above. Results are shown in Table XVII below.

TABLE XVII

| Example | Initial | | | | 5x Launder | | | Dryclean | | |
|---|---|---|---|---|---|---|---|---|---|---|
| | OR | WR | Kaydol | Stain E | OR | Kaydol | Stain E | OR | Kaydol | Stain E |
| 89 | 3 | W | 6 | 6 | 0 | 4 | 5 | 2 | 5 | 6 |
| 90 | 6 | 4 | 8 | 7 | 1 | 6 | 7 | 2 | 4 | 5 |

The results in TABLE XVII indicate that these compositions of the invention exhibit particularly desirable stain release properties.

Examples 91–93

Into a 500 mL three-necked flask fitted with a stirrer, a thermometer, and a reflux condenser, was placed 250 g (0.1 mol) of Intermediate I1 and 196 g ethyl acetate. About 20 g ethyl acetate was distilled out by using a Dean Stark trap. The reaction mixture was cooled to 40° C. under nitrogen. About 100 ppm IRGANOX™ 1010 antioxidant (Ciba-Geigy) was added. 15.5 g of isocyanotoethylmethacrylate (IEM, 0.1 mol) was added followed by 5 drops of stannous octoate catalyst. The reaction was heated at reflux (about 78° C.) for 5 hrs. No residual isocyanate absorption was detected in the infrared spectrum. A clear yellow solution was obtained. The solvent was removed by aspirator vacuum. A slightly yellow solid was obtained. Using the same procedure, further compositions were made from the components shown in Table XVIII below, wherein m-TMI represents 1(1-isocyanato-1-methyl-ethyl)-4-(1-methylethenyl)benzene (available from American Cyanamide).

TABLE XVIII

| Example | Components | Molar Ratios |
|---|---|---|
| 91 | Intermediate I1/IEM | 1/1 |
| 92 | Intermediate I1/m-TMI | 1/1 |
| 93 | Intermediate I1/ allylisocyanate | 1/1 |

Example 94

Into a 500 mL polymerization bottle was placed 44 g (0.016 mol) of the composition of Example 94, 3.1 g (0.009 mole) of octadecyl methacrylate (ODMA), 116 g butyl acetate, and 0.37 g AIBN. The reaction mixture was degassed using an aspirator vacuum. Under a gentle nitrogen flow, 2.9 g (0.027 mol) vinylidine chloride ($VCl_2$) was charged to the reaction mixture. The polymerization bottle was sealed with a cap, and placed in a preheated launderometer at 75° C. The polymerization was run for 16 hrs at 75° C. At 75° C., a clear yellow solution resulted. Gas chromatrographic analysis indicated that only traces of monomers remained. A dispersion was prepared according to the emulsification procedure set forth in Example 1.
With reference to Formula I, the composition contains a compound wherein
x=H or —$C(CH_3)_2CN$
$R_1=R_2=H$
Q=—$SO_2N(CH_3)CH_2CH_2O(O)C$—
$R_f$=—$C_8F_{17}$
a=4
b=0
E=—$CH_2CH_2$—
m=1
Z=—$NHCO_2$—

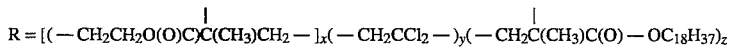

wherein each Z is bonded to R through an ethylene group of a methacrylate unit, n is the number of methacrylate units in the polymeric backbone, and x, y, and z refer to the respective number of monomer units incorporated into the polymeric backbone.

Example 95

Using the procedure of Example 94, the composition of Example 95 was prepared using the composition of Example 92, ODMA, and $VCl_2$ in a weight ratio of 88/6.2/5.8.

Example 96

Into a 500 mL three-necked flask fitted with a reflux condenser, a thermometer, and a stirrer, was placed 68.1 g of the composition of Example 92 (0.025 mol), and 65 g butyl acetate. By using a Dean Stark trap, 20 g butyl acetate was distilled out. The reaction mixture was cooled to 60° C. under nitrogen. 16.8 g of hexadecene (0.075 mol) and 12 g (0.2 eq) of a siloxane of the formula

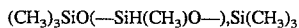

wherein n is about 40 (available as BAYSILONE OL MH15™ silicone from Bayer, West Germany). was added. The reaction mixture was heated up to 110° C. Then 0.2 mL of 1% $H_2PtCl_6$ in methyl ethyl ketone was added. A very exothermic reaction was observed. After 15 min another 0.2 mL of the catalyst solution was added. The reaction was heated up to reflux for 1 hr. A yellow brown solution was obtained containing a polymethylsiloxane substituted with an oligomeric urethane-containing oligomer.

A dispersion was prepared using the emulsification procedure of Example 1 and then acidified to a pH of about 2.2 using 0.3M HCl.

with reference to Formula I,
X=H or $-C(CH_3)_2CN$
$R_1R_2$=H
Q=$-SO_2N(CH_3)CH_2CH_2O(O)C-$
$R_f$=$-C_8F_{17}$
a=4
b=0
m=1
n=about 5
E=$-CH_2CH_2-$
Z=$-NHCO_2-$

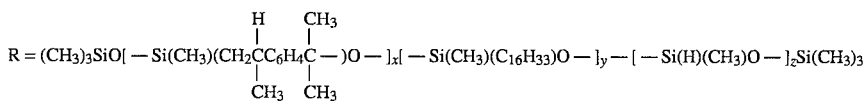

wherein x, y, and z are approximately 5, 15, and 20, respectively, and wherein each Z is bonded to the methine carbon in the unit of R designated in the formula above by x.

Example 97

Using the same synthetic procedure and emulsification procedure as in Example 96, the composition of Example 97 was prepared using the composition of Example 93, hexadecene and the siloxane.

Compositions were applied to a polyester/cotton 65/35 blend fabric at a 0.3% solids on fabric and testing according to the test procedure set forth above. No resins were used. The results are shown below in Table XIX below.

TABLE XIX

| Example | Initial | | 5X Laundered | | 1 Dryclean | |
|---|---|---|---|---|---|---|
| | OR | SR | OR | SR | OR | SR |
| 94 | 6 | 100 | 5 | 80 | 5 | 80 |
| 95 | 6 | 80 | 4 | 50 | 4 | 50 |
| 96 | 4 | 100 | 4 | 70 | 4 | 50 |
| 97 | 5 | 90 | 4 | 70 | 4 | 50 |
| Comparative Example 4 | 5 | 70 | 4 | 70 | 3 | 50 |
| Comparative Example 5 | 6 | 50 | 2 | 0 | 4 | 50 |
| Comparative Example 6 | 5 | 50 | 0 | 0 | 3 | 50 |

The composition of Example 94 exhibits particularly good oil repellent properties, even after laundering or dry cleaning, despite the absence of groups such as a blocked isocyanato. Further, the compositions of Examples 96 and 97 imparted a very soft hand to the fabrics treated therewith.

Examples 98–101

The composition prepared in Example 4 was emulsified using the emulsification procedure outlined in Example 1, but instead of MARLOWET™5401 emulsifier the ammonium salt of Intermediate I13 was used in combination with another anionic surfactant.

Into a 500 mL three-necked flask fitted with a condenser, a stirrer, and a thermometer, was placed 233 g of a 60% solution of the composition of Example 4 in ethyl acetate; 93 g of ethyl acetate was added to make a 40% dilution in ethyl acetate. The mixture was heated to 60° C. and a clear, brown solution was obtained. 2.1 g of the ammonium salt of Intermediate I13, (made by neutralization of I13 with ammonium hydroxide in methyl ethyl ketone and removing the solvent in a vacuum oven at room temperature) was added.

In a 1000 mL beaker, a solution of 84 g ethylene glycol (60% by weight of total solids), 2.1 g of SIpONATE™DS-10 emulsifier (available from Alcolac, Inc.) and 500 g deionized water was heated up to 65° C. Under very vigorous mechanical action, the organic phase prepared above was added to this aqueous solution. A pre-emulsion was formed at about 60° C., which was passed through a preheated Manton-Gaulin emulsifier at about 60° C. and 28000 kPa. After the solvent was removed at reduced pressure at about 45° C., a transparent, slightly brown dispersion was obtained.

In Examples 99–101, the same composition was emulsified using MARLOWET™5401 emulsifier, SIPONATE™DS-10 emulsifier, and TRITON™X-305 emulsifier, respectively, as emulsifiers. The resulting disperions were applied to a polyester/cotton 65/35 blend fabric at 0.3% solids on fabric and the drying/curing conditions set forth above. Results are shown in Table XX below.

0.3% solids on fabric of the composition of Example 4 and 0.2% solids on fabrics of extender. The fabric was dried, cured, and tested according to procedures set forth above. The results are shown in Table XXI below, wherein Extender 1 is a copolymer of $_2$-ethylhexyl methacrylate and N-methylol acrylamide in a 90/10 weight ratio, prepared according to Example 2 of U.S. Pat. No. 3,849,521 (Kirimoto et al.), and Extender 2 is prepared by reaction of PAPI and 2-butanoneoxime according to Example 1 of EP 0,196,309 (Deiner et al.).

TABLE XX

| Example | Emulsifier | Emulsifier Level as % by Wt. of Solids | Initial OR | Initial SR | 5x Launder OR | 5x Launder SR | Dryclean OR | Dryclean SR |
|---|---|---|---|---|---|---|---|---|
| 98 | 113 $NH_4^+$ salt | 1.5% | 6 | 100 | 5 | 80 | 5 | 100 |
|  | SIPONATE DS-10 | 1.5% |  |  |  |  |  |  |
| 99 | SIPONATE DS-10 | 3% | 4 | 90 | 2 | 70 | 2 | 70 |
| 100 | MARLOWET 5401 | 10% | 5 | 100 | 3 | 90 | 4 | 90 |
| 101 | TRITON X-305 | 7% | 4 | 80 | 2 | 60 | 2 | 60 |

Anionic emulsifiers typically have a negative effect on water repellency of textile treatment agents. The anionic emulsifier used in Example 98 however, does not show this negative effect. Rather, the data in Table XX show that the dispersion used in Example 98 performs better than the dispersions made using the cationic and non-ionic emulsifiers used in Examples 99–101.

TABLE XXI

| Example | Treatment Composition | % Solution Fabric | Initial OR | Initial SR | Water Repellency (Bundesmann) 1' | 5' | 10' | 5x Launder OR | 5x Launder SR | Dryclean OR | Dryclean SR |
|---|---|---|---|---|---|---|---|---|---|---|---|
| 102 | Example 4 | 0.3 | 5 | 100 | 4 | 3.5 | 3.5 | 3 | 90 | 4 | — |
| 103 | Example 4 + extender 1 | 0.3 + 0.2 | 7 | 100 | 5 | 5 | 5 | 6 | 90 | 6 | 90 |
| 104 | Example 4 + extender 2 | 0.3 + 0.2 | 6 | 100 | 5 | 5 | 5 | 5 | 100 | 5 | 100 |
| 105 | Example 1 | 0.3 | 6 | 100 | 4.5 | 4.5 | 4 | 4 | 90 | 5 | 90 |
| 106 | Example 1 + extender 1 | 0.3 + 0.2 | 7 | 100 | 5 | 5 | 5 | 6 | 90 | 6 | 90 |
| 107 | Example 1 + extender 2 | 0.3 + 0.2 | 6 | 100 | 5 | 5 | 5 | 5 | 100 | 5 | 100 |
| 108 | Example 1 | 0.4 | 6 | 100 | 5 | 4.5 | 4 | 4 | 90 | 5 | 90 |
| 109 | Example 1 + extender 1 | 0.32 + 0.08 | 6 | 100 | 5 | 5 | 4.5 | 5 | 90 | 5 | 90 |
| 110 | Example 1 + extender 2 | 0.32 + 0.08 | 6 | 100 | 5 | 5 | 5 | 5 | 90 | 5 | 100 |
| Comparative Example 7 | AG-310 | 0.4 | 3 | 100 | 3 | 1 | 1 | 2 | 70 | 2 | 70 |
| Comparative Example 8 | OLEOPHOBOL PF | 0.4 | 4 | 100 | 5 | 4 | 3.5 | 2 | 90 | 2 | 100 |

Examples 102–110

The composition of Example 4 was used along with the resin formulation (described above in connection with the treatment of cotton fabric) and in combination with an extender in order to obtain a 100% cotton fabric treated with The data in Table XXI indicate that good oil and water repellency results are obtained even after laundering and drycleaning, even on very hard to treat fabrics (such as cotton) using these compositions of the invention in combination with conventional fluorine-free extenders.

Examples 111–112

In these Examples, a composition of the invention is used together with a softener. In the manner of Example 1 of European Patent Application 314,944 (Vogel et al.), the composition of Example 1 above was formulated with the components listed in Table XXII below, and 100% cotton and polyester/cotton 65/35 blend fabrics were treated, dried, cured and tested as set forth above. The resin formulation described above was used for the treatment of the cotton fabric. Results are shown in Table XXII below.

Example 6 (described in Example 2 of U.S. Pat. No. 4,302,366) at a level of 2% solids on fiber. The treatment was carried out as follows: A sample of leather (about 20 cm×30 cm) was placed in a glass drum with water (300 percent water based on the weight of the leather sample) and agitated for 1 hour at 40° C. The water was drained off and the leather was again wetted with water (150 percent water based on the weight of the leather sample) and agitated for 10 minutes at 40° C. The pH was adjusted to 7.0 using an aqueous ammonium hydroxide solution (10 percent ammonium hydroxide based on the weight of water in the solu-

TABLE XXII

| Example | Components | % Solids on Fabric | Calculated ppm F on Fabric | Initial OR | Initial SR | Water Repellency (Bundesman) 1' | 5' | 10' | Absorption (%) | 5x Launder OR | 5x Launder SR | 1x Dryclean OR | 1x Dryclean SR |
|---|---|---|---|---|---|---|---|---|---|---|---|---|---|
| | | | | | | RESULTS ON 100% COTTON | | | | | | | |
| 111 | Example 1 | 0.45% | | | | | | | | | | | |
| | $^A$polyethylene wax | 0.08% | 1880 | 5 | 100 | 4 | 3.5 | 3 | 13.4 | 5 | 90 | 5 | 90 |
| | $^B$PHOBOTON AFN | 0.37% | | | | | | | | | | | |
| 112 | Example 1 | 0.29% | | | | | | | | | | | |
| | $^A$polyethylene wax | 0.08% | | 5 | 100 | 5 | 5 | 5 | 10.8 | 5 | 100 | 5 | 100 |
| | $^B$PHOBOTON AFN | 0.24% | 1230 | | | | | | | | | | |
| | extender 2 | 0.29% | | | | | | | | | | | |
| | Comparative Example 9 (Example 1 of EP 314,944 | 0.9% in total | 2060 | 5 | 100 | 3.5 | 3 | 2 | 19.3 | 5 | 80 | 5 | 90 |
| | | | RESULTS ON 65/35 POLYESTER/COTTON BLEND | | | | | | | | | | |
| 111 | as above | as above | 1880 | 6 | 100 | 4.5 | 4 | 3.5 | 11.9 | 5 | 90 | 5 | 100 |
| 112 | as above | as above | 1230 | 6 | 100 | 5 | 5 | 5 | 6.2 | 5 | 90 | 5 | 100 |
| Comparative Example 10 | as above | as above | 2060 | 5 | 100 | 4 | 4 | 3.5 | 12.4 | 5 | 90 | 5 | 90 |

A. The polyethylene wax used is available as ADALIN™ wax from Henkel, West Germany.

B. PHOBOTON™ AFN silicone is a modified hydrogenalkyl polysiloxane available from Chemische Fabrik Pfersee, West Germany.

All treatments imparted a pleasant, very soft hand to the treated fabrics.

The results in Table XXII indicate that the compositions of this invention in combination with softeners give a soft hand and durable high repellency to the fabric treated therewith without a concomitant loss in oil repellency relative to the Comparative Examples.

Further Examples not intended to be limiting are set forth below to illustrate the use of compositions of the invention on several fibrous substrates.

Leather

Leather samples (safety leather, Westdeutsche Gerberschule Reutlingen) were independently treated with the composition of Example 80 and the composition of Comparative tion). The fluorochemical composition was then added as a dispersion at a level of 2 percent solids on fiber, and the mixture was agitated for 30 minutes. The pH was then adjusted to 3.5 with an aqueous formic acid solution (10 percent formic acid by weight based on the weight of the water in the solution), and the water was drained off. The treated leather was washed in the drum with water (200 percent by weight water based on the weight of the leather sample) for 10 minutes at 40° C., and hung to dry in air overnight at room temperature. The air-dried leather was then oven dried for 1 hour at 60° C., and conditioned overnight in a constant temperature room at 21° C. and 55% relative humidity. The treated leather was tested according to the test methods described above. Results are shown in Table XXIII below.

The results in TABLE XXIII show that the acid salt-containing composition of Example 80 exhibits good repellent properties on both suede and grain leather under both dynamic and static conditions.

TABLE XXIII

| Substrate | Initial | | | Abrasion | | Static Absorption | | Bally Penetrometer Dynamic Absorption (% water) | | | | |
|---|---|---|---|---|---|---|---|---|---|---|---|---|
| | OR | WR | SR | OR | WR | % oil | % water | Penetration Time | 1 hr | 2 hr | 3 hr | 4 hr |
| Example 80 | | | | | | | | | | | | |
| grain | 6 | 9 | 100 | 5 | 8 | 0 | 27.8 | 2 hrs. | 11.0 | 14.5 | — | — |
| suede | 6 | 8 | 100 | 4 | 6 | | | >4 hrs. | 12.3 | 15.3 | 15.6 | 17 |
| Comparative Example 6 | | | | | | | | | | | | |
| grain | 3 | 8 | 90 | 1 | 3 | 3.3 | 33.0 | 65 min. | 28 | 40 | — | — |
| suede | 4 | 6 | 90 | 2 | 4 | | | 90 min. | 13 | 25 | — | — |

Nonwovens

A binder (B. F. Goodrich Acrylic binder No. 2600–300) was added to a C. H. Dexter non-woven fabric (90% cellulose/10% polyester). A mixture containing 1% by weight of the compositions indicated in Table XXIV below and 70% by weight of the binder was applied to a sheet of the substrate by padding at 100% wet pick-up. The material was dried/cured by placing the wet sheet of non-woven fabric on a sheet drier at 300° F. (149° C.), until dry. Results are shown in Table XXIV below.

TABLE XXIV

| Example | OR | WR | SR | Impact Penetration (g water) |
|---|---|---|---|---|
| 80 | 5 | 8 | 80 | 6.39 |
| 82 | 6 | 8 | 90 | 4.85 |
| 87 | 6 | 8 | 70 | 3.15 |
| Comparative Example 5 | 5 | 5 | 70 | 12.26 |

TABLE XXIV indicates that these compositions of the invention have superior repellent properties on non-wovens compared to composition of Comparative Example 5.

The compositions indicated in the following table were emulsified as appropriate and applied to a Chicopee non-woven (60% cellulose/40% polyester) by padding at 0.35% solids on fabric and tested according to the procedures set forth above. No binders were used. Results are shown in Table XXV below.

TABLE XXV

| Example | OR | WR | SR | Impact Penetration (g water) |
|---|---|---|---|---|
| 1 | 6 | 10 | 70 | 10.08 |
| 16 | 6 | 8 | 70 | 11.09 |
| 24 | 5 | 10 | 50 | 10.20 |
| 36 | 4 | 8 | 80 | 8.92 |
| 49 | 6 | 6 | 80 | 9.90 |

TABLE XXV indicates that these compositions of the invention exhibit good repellent properties, particularly impact penetration, on non-wovens.

Paper

The compositions listed in the following table were applied to a 100% cellulose paper at 0.3% solids on fiber via the wet-end method as described in U.S. Pat. No. 4,426,466 (Schwartz). KYMENE™557H resin (Hercules) was used as a retention aid. The paper samples were dried and cured at 150° C. for about 5 min on a hot plate contact dryer. Results are shown in Table XXVI below.

TABLE XXVI

| Example | Kit Test no | OR | WR | Cobb Test (g/m²) |
|---|---|---|---|---|
| 1 | 9 | 2 | 2 | 69.6 |
| 16 | 7 | 3 | W | 95.1 |
| 24 | 8 | 2 | 2 | 48.7 |
| 49 | 8 | 4 | 1 | 60.3 |
| 82 | 11 | 7 | 10 | 44.1 |
| 87 | 8 | 2 | 3 | 55.7 |
| Comparative Example 6 | 8 | 3 | W | 164.7 |

TABLE XXVI indicates that these compositions of the invention, particularly the composition of Examples 82 and 87 (containing acid salts) impart good repellent properties to paper.

Nylon Fabric

The compositions listed in the following table were emulsified and applied at 0.35% solids on fabric to undyed nylon (available from Testfabrics Inc.) by adding at 51% wet pick-up, dried at 700° C. for 10 min and cured at 130° C. for 5 min and tested according to the test procedures set forth above. No resins were used. Results are shown in Table XXVII below.

TABLE XXVII

| Example | Initial Abrasion | | | | 5X Laundered | | | Dryclean | | |
|---|---|---|---|---|---|---|---|---|---|---|
| | OR | WR | OR | SR | OR | WR | SR | OR | WR | SR |
| 41 | 5 | 6 | 2 | 100 | 2 | 3 | 100 | 4 | 4 | 90 |
| 49 | 5 | 8 | 5 | 100 | 4 | 5 | 100 | 5 | 5 | 90 |
| 50 | 5 | 7 | 2 | 80 | 3 | 4 | 50 | 5 | 4 | 50 |
| 60 | 5 | 8 | 3 | 100 | 4 | 4 | 90 | 5 | 5 | 90 |
| 73 | 5 | 7 | 2 | 80 | 5 | 5 | 80 | 4 | 5 | 70 |

The results in the Tables above generally show that these compositions of the invention give good repellent properties even after laundering or drycleaning, on a variety of fibrous materials such as leather, paper, non-wovens, and polyamides.

Various modifications and alterations of this invention will be apparent to those skilled in the art without departing from the scope and spirit of this invention. This invention should not be restricted to those embodiments set forth herein for illustrative purposes.

What is claimed is:

1. A fluorochemical composition comprising one or more fluorinated compounds, each of the latter comprising:

(i) a fluorochemical oligomeric portion comprising an aliphatic backbone with a plurality of fluoroaliphatic groups attached thereto, each fluoroaliphatic group comprising a fully fluorinated terminal group and each independently linked to a carbon atom of the aliphatic backbone through an organic linking group containing from 1 to about 20 carbon atoms; p1 (ii) an organic moiety substantially unreactive to isocyanates under conditions conventionally employed to react a nucleophile with an isocyanate;

(iii) a non-polymeric isocyanate-derived linking group, which links the fluorochemical oligomeric portion to the organic moiety; and (iv) bonded thereto, a siloxanyl group which can impart a soft hand, a polyoxyalkylene group that can impart stain release, a long chain alkyl group that can impart water repellency, or a blocked isocyanato group that can impart a durable property when the compound is applied to a fibrous substrate, with the proviso that any group that can impart stain release is bonded to the fluorochemical oligomeric portion.

2. A composition according to claim 1, wherein the fluorinated compound is of the formula

   (A—Z)$_n$R wherein A is a fluorochemical oligomeric portion of the formula

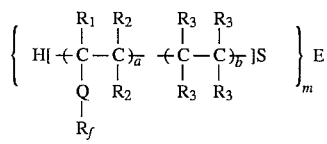

and wherein n is a whole number from 1 to about 10;

m is an integer from 1 to about 5;

a and b and m are integers such that A is oligomeric and comprises a plurality of R$_f$ groups;

$R_1$ is hydrogen, halogen, or straight chain or branched chain alkyl containing 1 to about 4 carbon atoms;

each $R_2$ is independently hydrogen or straight chain or branched chain alkyl containing 1 to about 4 carbon atoms;

Q is an organic linking group containing from 1 to about 20 carbon atoms;

$R_f$ is a fluoroaliphatic group comprising a fully fluorinated terminal group;

each $R_3$ is independently hydrogen, halogen, or an organic group free of groups that substantially interfere with free-radical oligomerization;

E is an organic group containing from 1 to about 20 carbon atoms;

each Z independently comprises a non-polymeric isocyanate-derived linking group;

R is an organic moiety substantially unreactive to isocyanates under conditions conventionally employed to react a nucleophile with an isocyanate;

one of the $R_1$, $R_2$, $R_3$, Q, and E groups has an unsatisfied valence through which the group is bonded to Z;

and wherein at least one of $R_1$, $R_2$, $R_3$, Q, E, and R comprises a siloxanyl group that can impart soft hand, a polyoxyalkylene group that can impart stain release, a long chain alkyl group that can impart water repellency, or a blocked isocyanato group that can impart a durable property when the compound is applied to a fibrous substrate, with the proviso that any group that can impart stain release is bonded to $R_1$, $R_2$, $R_3$, Q, or E.

3. A composition according to claim 1, wherein the fluorinated compound is of the formula

A(Z—R)$_n$ wherein A is a fluorochemical oligomeric portion of the formula

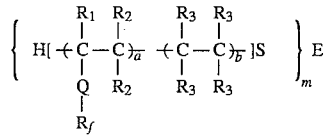

and wherein n is a whole number from 1 to about 10;

m is an integer from 1 to about 5;

a and b and m are integers such that A is oligomeric and comprises a plurality of R$_f$ groups;

$R_1$ is hydrogen, halogen, or straight chain or branched chain alkyl containing 1 to about 4 carbon atoms;

each $R_2$ is independently hydrogen or straight chain or branched chain alkyl containing 1 to about 4 carbon atoms;

Q is an organic linking group containing from 1 to about 20 carbon atoms;

$R_f$ is a fluoroaliphatic group comprising a fully fluorinated terminal group;

each $R_3$ is independently hydrogen, halogen, or an organic group free of groups that substantially interfere with free-radical oligomerization;

E is an organic group containing from 1 to about 20 carbon atoms;

each Z independently comprises a non-polymeric isocyanate-derived linking group;

R is an organic moiety substantially unreactive to isocyanates under conditions conventionally employed to react a nucleophile with an isocyanate;

at least one of the $R_1$, $R_2$, $R_3$, Q, and E groups has at least one unsatisfied valence, through which each such group is bonded to a separate group Z, the total number of unsatisfied valences being equal to the value of the integer n;

and wherein at least one of $R_1$, $R_2$, $R_3$, Q, E, and R comprises a siloxanyl group that can impart soft hand, a polyoxyalkylene group that can impart stain release, a long chain alkyl group that can impart water repellency, or a blocked isocyanato group that can impart a durable property when the compound is applied to a fibrous substrate, with the proviso that any group that can impart stain release is bonded to $R_1$, $R_2$, $R_3$, Q, or E.

4. A composition according to claim 1, wherein the fluorinated compound is of the formula

wherein B is a fluorochemical oligomeric portion of the formula

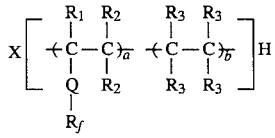

and wherein

X is a group derived from a free radical initiator;

n is a whole number from 1 to about 10;

a and b are integers such that B is oligomeric and comprises a plurality of $R_f$ groups;

$R_1$ is hydrogen, halogen, or straight chain or branched chain alkyl containing 1 to about 4 carbon atoms;

each $R_2$ is independently hydrogen or straight chain or branched chain alkyl containing 1 to about 4 carbon atoms;

Q is an organic linking group containing from 1 to about 20 carbon atoms;

$R_f$ is a fluoroaliphatic group comprising a fully fluorinated terminal group;

each $R_3$ is independently hydrogen, halogen, or an organic group free of groups that substantially interfere with free-radical oligomerization;

each Z independently comprises a non-polymeric isocyanate-derived linking group;

R is an organic moiety substantially unreactive to isocyanates under conditions conventionally employed to react a nucleophile with an isocyanate;

one of the $R_1$, $R_2$, $R_3$, Q, and X groups has an unsatisfied valence through which the group is bonded to Z;

and wherein at least one of $R_1$, $R_2$, $R_3$, Q, X, and R comprises a siloxanyl group that can impart soft hand, a polyoxyalkylene group that can impart stain release, a long chain alkyl group that can impart water repellency, or a blocked isocyanato group that can impart a durable property when the compound is applied to a fibrous substrate, with the proviso that any group that can impart stain release is bonded to $R_1$, $R_2$, $R_3$, Q, or X.

5. A composition according to claim 1, wherein the isocyanate-derived linking group is urethanylene.

6. A composition according to claim 1, wherein the isocyanate-derived linking group is ureylene, biuretylene, guanidinylene, allophanatylene, or oxazolidinonylene, or a sulfur analog thereof.

7. A composition according to claim 1, wherein the organic moiety comprises an aromatic moiety.

8. A composition according to claim 1, wherein the organic moiety comprises the polyphenyl moiety of polyphenyl polyisocyanate.

9. A composition according to claim 1, wherein the organic moiety comprises a polymerizable double bond capable of free-radical polymerization or hydrosilation.

10. A composition according to claim 1, wherein the organic moiety is a mono, di, or polyvalent polymeric chain.

11. A composition according to claim 1, wherein the fluorinated compound further comprises a group that can impart a durable property when the compound is applied to a fibrous substrate.

12. A composition according to claim 1, wherein the fluorinated compound comprises from about 5 percent to about 80 percent fluorine by weight based on the total weight of the compound.

13. A composition according to claim 1, wherein the flourinated compound comprises from about 20 percent to about 80 percent fluorine by weight based on the total weight of the compound.

14. A composition according to claim 1, wherein the fluorinated compound comprises from about 25 percent to about 55 percent fluorine by weight based on the total weight of the compound.

15. A composition according to claim 11, wherein the organic moiety comprises a group that can impart a durable property when the compound is applied to a fibrous substrate.

16. A composition according to claim 15, wherein the group comprises blocked isocyanato, a carboxylic acid, or a carboxylic acid salt.

17. A composition according to claim 1, wherein the fluorinated compound comprises a group that can impart a soft hand when the compound is applied to a fibrous substrate.

18. A composition according to claim 17, wherein the group is a siloxanyl group.

19. A composition according to claim 1, wherein the fluorinated compound comprises a group that can impart stain release when the compound is applied to a fibrous substrate.

20. A composition according to claim 19, wherein the group is a polyoxyalkylenyl group.

21. A composition according to claim 1, wherein the organic moiety comprises a siloxanyl group.

22. A composition according to claim 1, wherein the aliphatic backbone of the fluorochemical oligomeric portion consists essentially of polymerized units derived from a fluorochemical monomer.

23. A composition according to claim 1, wherein the fluorochemical oligomeric portion contains from 2 to about 8 polymerized units derived from a fluorochemical monomer.

24. A composition according to claim 1, wherein the fluorochemical oligomeric portion contains from 2 to about 4 polymerized units derived from a fluorochemical monomer.

25. A composition according to claim 1, wherein the fluorochemical oligomeric portion contains from 2 to about 8 polymerized units derived from a combination of fluorochemical and non-fluorinated monomers, and wherein the ratio of the number of polymerized units derived from the fluorochemical monomer to the number of polymerized units derived from the non-fluorinated monomer is about 4:1.

26. A composition according to claim 25, wherein the fluorochemical oligomeric portion contains from 2 to about 4 polymerized units.

27. A substrate with oil and water repellent properties comprising a fibrous substrate material having on the surface thereof an amount of a composition according to claim 1 effective to impart oil and water repellent properties thereto.

28. A substrate according to claim 27, wherein the fibrous substrate is paper, non-woven, cotton, a polyester-cotton blend, nylon, or leather.

29. A method for imparting oil and water repellent properties to a fibrous substrate material, comprising the steps of:
(1) applying to the surface of the fibrous substrate material an amount of a composition according to claim 1 effective to impart oil and water repellent properties to the substrate; and
(2) heating the treated substrate from step (1) at a temperature and for a time sufficient to cure the treated substrate.

30. A composition according to claim 1 in the form of an aqueous liquid dispersion, comprising: water; a fluorinated compound according to claim 1 in an amount effective to impart repellent properties to a substrate treated with the dispersion; and an emulsifier in an amount effective to stabilize the dispersion.

31. A composition according to claim 1 in the form of an aqueous liquid dispersion, comprising: a fluorinated compound according to claim 1 in an amount effective to impart repellent properties to a substrate treated with the dispersion; water in an amount of about 70 to about 900 parts by weight based on 100 parts by weight of the fluorinated compound; and an emulsifier in an amount of about 1 to about 25 parts by weight based on 100 parts by weight of the fluorinated compound.

32. An aqueous liquid dispersion according to claim 30, wherein the emulsifier comprises a fluorochemical emulsifier of the formula

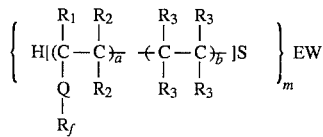

wherein
m is an integer from 1 to about 5;
a and b are integers such that the chain of polymerized units is oligomeric and contains a plurality of $R_f$ groups;
$R_1$ is hydrogen, halogen, or straight chain or branched chain alkyl containing 1 to about 4 carbon atoms;
each $R_2$ is independently hydrogen or straight chain or branched chain alkyl containing 1 to about 4 carbon atoms;
Q is an organic linking group containing from 1 to about 20 carbon atoms;
$R_f$ is a fluoroaliphatic group comprising a fully fluorinated terminal group;
each $R_3$ is independently hydrogen, halogen, or an organic group free of groups that substantially interfere with free-radical oligomerization;
E is an organic group containing from 1 to about 20 carbon atoms; and
W represents the hydrophilic portion of an anionic surfactant, a cationic surfactant, a non-ionic surfactant, or an amphoteric surfactant.

33. An aqueous liquid dispersion according to claim 30, wherein the emulsifier comprises a fluorochemical emulsifier of the formula

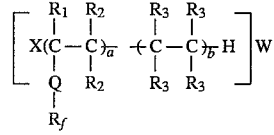

wherein
a and b are integers such that the chain of polymerized units is oligomeric and contains a plurality of $R_f$ groups;
$R_1$ is hydrogen, halogen, or straight chain or branched chain alkyl containing 1 to about 4 carbon atoms;
each $R_2$ is independently hydrogen or straight chain or branched chain alkyl containing 1 to about 4 carbon atoms;
Q is an organic linking group containing from 1 to about 20 carbon atoms;
$R_f$ is a fluoroaliphatic group comprising a fully fluorinated terminal group;
each $R_3$ is independently hydrogen, halogen, or an organic group free of groups that substantially interfere with free-radical oligomerization;
X is a group derived from a free-radical initiator, with the proviso that X has an unsatisfied valence through which it is bonded to W; and
W represents the hydrophilic portion of an anionic surfactant, a cationic surfactant, a non-ionic surfactant, or an amphoteric surfactant.

34. An aqueous liquid dispersion according to claim 30, further comprising a fluorine-free extender.

35. An aqueous liquid dispersion according to claim 30, further comprising a fluorine-free softener system.

36. An aqueous liquid dispersion according to claim 34, further comprising a fluorine-free softener system.

* * * * *

UNITED STATES PATENT AND TRADEMARK OFFICE
CERTIFICATE OF CORRECTION

PATENT NO.: 5,453,540

DATED: September 26, 1995

INVENTOR(S): Rudolf J. Dams and Johan E. DeWitte

It is certified that error appears in the above-identified patent and that said Letters Patent is hereby corrected as shown below:

Col. 5, line 56, after "(such as urethanylene);" delete -- p1 --.

Col. 6, line 58, "R3" should read -- $R_3$ --.

Col. 9, line 36, "imino-4,6-dioxohexahydro-,3,5-oxdiazinylene" should read
-- imino-4,6-dioxohexahydro-1,3,5-oxdiazinylene --.

Col. 9, line 60, "$R_l$" should read -- $R_1$ --.

Col. 10, line 12, "wool" should read -- Wool --.

Col. 11, line 44, "-- $CHCH_2(CH_2)_kO(O)C$ --" should read -- $CH=CH_2(CH_2)_kO(O)C$ -- --.

Col. 12, line 37, "homolyric" should read -- homolytic --.

Col. 12, line 48, "2,2,-azobis" should read -- 2,2'-azobis --.

Col. 12, line 53, "2,2'-azobis[2-" should read -- 2,2'-azobis{2- --.

Col. 12, line 55, propionamide]; should read -- propionamide}; --.

UNITED STATES PATENT AND TRADEMARK OFFICE
CERTIFICATE OF CORRECTION

PATENT NO.: 5,453,540

DATED: September 26, 1995

INVENTOR(S): Rudolf J. Dams and Johan E. DeWitte

It is certified that error appears in the above-identified patent and that said Letters Patent is hereby corrected as shown below:

Col. 13, lines 45-65, should read

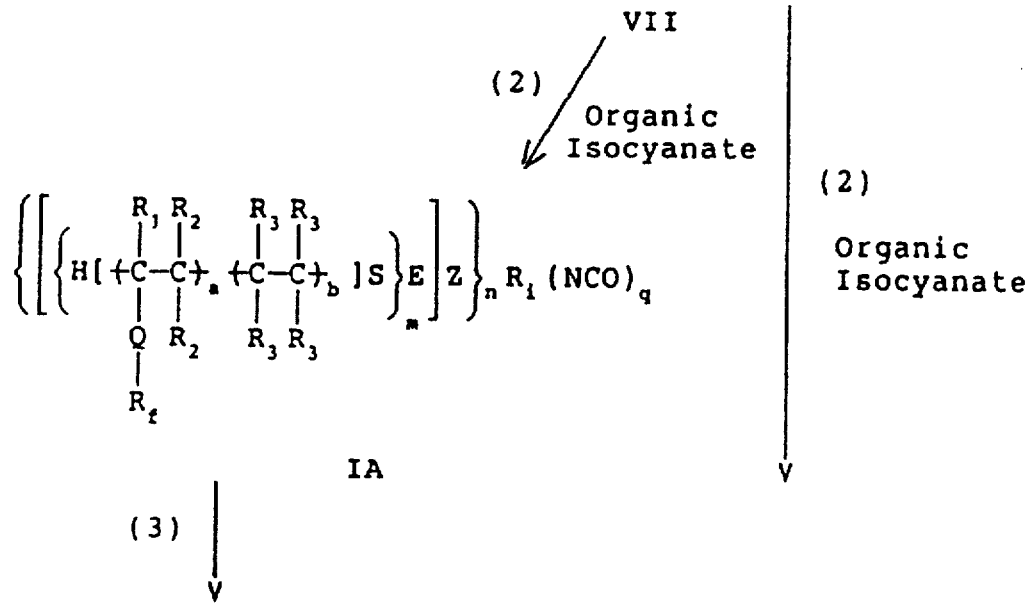

UNITED STATES PATENT AND TRADEMARK OFFICE
CERTIFICATE OF CORRECTION

PATENT NO.: 5,453,540

DATED: September 26, 1995

INVENTOR(S): Rudolf J. Dams and Johan E. DeWitte

It is certified that error appears in the above-identified patent and that said Letters Patent is hereby corrected as shown below:

Col. 14, lines 27-38 should read --

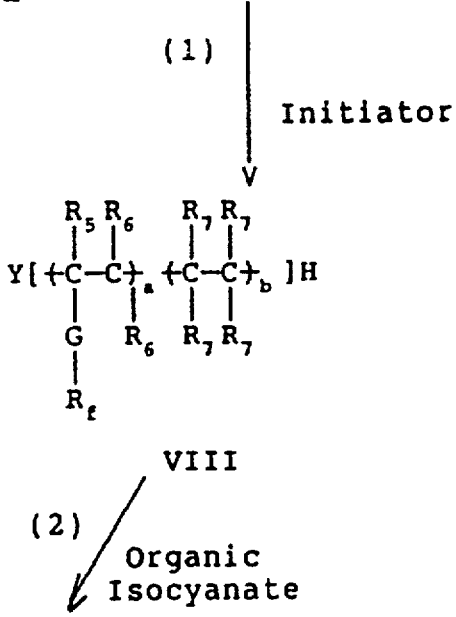

Col. 15, line 40, "vinyltrime thoxysilane," should read -- vinyltrimethoxysilane, --.

Col. 15, line 42, "2-chloroacryl onitrile," should read -- 2-chloroacrylonitrile, --.

Col. 16, line 34, "di allyl" should read -- diallyl --.

UNITED STATES PATENT AND TRADEMARK OFFICE
CERTIFICATE OF CORRECTION

PATENT NO.: 5,a453,540

DATED: September 26, 1995

INVENTOR(S): Rudolf J. Dams and Johan E. DeWitte

It is certified that error appears in the above-identified patent and that said Letters Patent is hereby corrected as shown below:

Col. 16, line 55, "4-hydroxythiopheno3-mercapto-1,2-pro-" should read

-- 4-hydroxythiophenol, 3-mercapto-1,2-pro --.

Col. 16, line 65, "cystsine, cystsin hydrochloride, cystsine ethylester." should read -- cysteine, cystein hydrochloride, cysteine ethylester. --.

Col. 17, line 64, "alicyclic" should read -- alicyclic --.

Col. 19, line 20, "alicyclic" should read -- alicyclic --.

Col. 19, line 30, "(1'-isocyanato-" should read -- 1(1'-isocyanato- --.

Col. 20, line 55, "z" should read -- Z --.

Col. 21, line 6, "eta l.)," should read -- et al.), --.

Col. 23, line 66, "mixture .that" should read -- mixture that --.

Col. 26, line 63, "$_1$ICH$_2$CH$_2$I" should read -- $_1$CH$_2$CH$_2$I --.

Col. 28, line 21, "mn" should read -- mL --.

Col. 28, Table IV, Molar Ratios of Intermediate I37 should read -- 3.2/0.8/1/4 --.

Col. 29, line 44, "about 500C" should read -- about 50°C --.

Col. 30, line 26, "surfactantsolution" should read -- surfactant solution --.

Col. 32, line 51, "macromerit" should read -- macromeric --.

UNITED STATES PATENT AND TRADEMARK OFFICE
CERTIFICATE OF CORRECTION

PATENT NO.: 5,453,540

DATED: September 26, 1995

INVENTOR(S): Rudolf J. Dams and Johan E. DeWitte

It is certified that error appears in the above-identified patent and that said Letters Patent is hereby corrected as shown below:

Col. 51, line 30, "Germany). was added." should read -- Germany) was added. --.

Col. 51, line 43, "$R_1R_2=H$" should read -- $R_1 = R_2 = H$ --.

Col. 54, line 5, "2-ethylhexyl" should read -- 2-ethylhexyl --.

Col. 58, line 55, "700°C" should read -- 70°C --.

Col. 59, line 33, after "atoms;" delete -- p1 -- and insert a paragraph before "(ii)".

UNITED STATES PATENT AND TRADEMARK OFFICE
CERTIFICATE OF CORRECTION

PATENT NO.: 5,453,540

DATED: September 26, 1995

INVENTOR(S): Rudolf J. Dams and Johan E. DeWitte

It is certified that error appears in the above-identified patent and that said Letters Patent is hereby corrected as shown below:

Col. 33, line 12, "$R=[-C_5H_4CH_2[C_6H_3CH_2]-_{0.7}C_6H_4-][NHC(O)ON=C(CH_3)(CH_2CH_3)]_{1.7}$ should read -- $R=[-C_6H_4CH_2[C_6H_3CH_2]-_{0.7}C_6H_4-][NHC(O)ON=C(CH_3)(CH_2CH_3)]_{1.7}$ --.

Col. 33, line 55, "$Q---SO_2N(CH_3)CH_2CH_2O(O)C-$" should read

-- $Q = -SO_2N(CH_3)CH_2CH_2O(O)C-$ --.

Col. 34, line 62, Table VI, under the Column named Example, "15" should read -- 46 --.

Col. 36, line "Solution" should read -- solution --.

Col. 41, line 30, "$R = -C_6H_4CH_2(-C_6H_4N=C=NC_6H_4CH_2)-C_6H_4-$" should read -- $R = -C_6H_4CH_2(-C_6H_4N=C=NC_6H_4CH_2)_e-C_6H_4-$ --.

UNITED STATES PATENT AND TRADEMARK OFFICE
CERTIFICATE OF CORRECTION

PATENT NO. : 5,453,540
DATED : September 26, 1995
INVENTOR(S) : Rudolf J. Dams, et. al.

It is certified that error appears in the above-indentified patent and that said Letters Patent is hereby corrected as shown below:

Col. 47, Table XIV, in footnote A, "EXAMLES" should read -- EXAMPLES --.

Signed and Sealed this

Fourteenth Day of January, 1997

Attest:

BRUCE LEHMAN

*Attesting Officer*   *Commissioner of Patents and Trademarks*